US012742523B2

(12) United States Patent
Kawarazaki et al.

(10) Patent No.: US 12,742,523 B2
(45) Date of Patent: Sep. 22, 2026

(54) MANAGEMENT SYSTEM FOR VACUUM HEAT INSULATING BODY

(71) Applicant: Panasonic Intellectual Property Management Co., Ltd., Osaka (JP)

(72) Inventors: Hideji Kawarazaki, Osaka (JP); Shinya Kojima, Kyoto (JP); Toshiaki Hirano, Hyogo (JP); Masafumi Okawa, Osaka (JP); Masahiro Kagimoto, Shiga (JP); Atsunobu Tateishi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 670 days.

(21) Appl. No.: 18/000,765

(22) PCT Filed: May 17, 2021

(86) PCT No.: PCT/JP2021/018566

§ 371 (c)(1),
(2) Date: Dec. 5, 2022

(87) PCT Pub. No.: WO2022/014138

PCT Pub. Date: Jan. 20, 2022

(65) Prior Publication Data

US 2023/0204164 A1 Jun. 29, 2023

(30) Foreign Application Priority Data

Jul. 17, 2020 (JP) ................................ 2020-123279

(51) Int. Cl.
*F17D 5/02* (2006.01)
*G01M 3/26* (2006.01)

(52) U.S. Cl.
CPC ................ *F17D 5/02* (2013.01); *G01M 3/26* (2013.01)

(58) Field of Classification Search
CPC .. F17D 5/02; F25D 2201/14; F25D 2303/082; F25D 2303/0843;
(Continued)

(56) References Cited

U.S. PATENT DOCUMENTS

| | | | |
|---|---|---|---|
| 4,709,578 | A | 12/1987 | Iwasaki et al. |
| 2020/0049586 | A1 | 2/2020 | Eschenbach et al. |

FOREIGN PATENT DOCUMENTS

| | | | |
|---|---|---|---|
| CN | 2703182 | Y | 6/2005 |
| CN | 102620883 | A | 8/2012 |

(Continued)

OTHER PUBLICATIONS

International Search Report of PCT/JP2021/018566, Jul. 20, 2021, 2 pages.

(Continued)

*Primary Examiner* — Timothy J Thompson
*Assistant Examiner* — Guillermo J Egoavil
(74) *Attorney, Agent, or Firm* — HSML P.C.

(57) ABSTRACT

A management system (100) for a vacuum heat insulating body (10) includes: an inspection device (70) that inspects heat insulation performance of the vacuum heat insulating body (10); a storage portion (105) that stores information regarding the inspected heat insulation performance; an estimating portion (101) that estimates a remaining life, which is the rest of a life of the vacuum heat insulating body (10), from a time-lapse change of the heat insulation performance stored in the storage portion (105); and a determining portion (102) that determines whether or not the remaining life is a predetermined period of time or more.

15 Claims, 23 Drawing Sheets

(58) Field of Classification Search

CPC ..... F25D 2303/0844; F25D 2303/0845; F25D 3/08; G01M 3/26; G01M 3/3272; G01M 3/34; G06Q 10/0832

USPC ..................................................... 48/193; 174/8

See application file for complete search history.

(56) References Cited

FOREIGN PATENT DOCUMENTS

| | | | | | |
|---|---|---|---|---|---|
| CN | 104048837 | A | | 9/2014 | |
| CN | 206055200 | U | * | 3/2017 | ................ F17C 1/00 |
| JP | S61-107126 | | | 5/1986 | |
| JP | 2001-231681 | | | 8/2001 | |
| JP | 2007-126188 | | | 5/2007 | |
| JP | 2008-111493 | | | 5/2008 | |
| JP | 2008111493 | A | * | 5/2008 | ............. F16L 59/06 |
| JP | 2010-143602 | | | 7/2010 | |
| JP | 2011-102771 | | | 5/2011 | |
| JP | 2012-171733 | | | 9/2012 | |
| JP | 2017-20914 | | | 1/2017 | |
| JP | 2017020914 | A | * | 1/2017 | ............. G01M 3/28 |
| JP | 2018-143368 | | | 9/2018 | |
| JP | 6655815 | B2 | | 2/2020 | |
| KR | 2013-0078005 | A | | 7/2013 | |
| WO | 2012/017903 | | | 2/2012 | |

OTHER PUBLICATIONS

The extended European search report issued for European Patent Application No. 21841269.0, Dec. 4, 2023, 8 pages.

* cited by examiner

MANAGEMENT SYSTEM FOR VACUUM HEAT INSULATING BODY

TECHNICAL FIELD

The present disclosure relates to a management system for a vacuum heat insulating body.

BACKGROUND ART

A heat insulating container of PTL 1 is known as a conventional vacuum heat insulating body. This heat insulating container includes a container and a bag that accommodates the container and has a heat insulation property. The bag includes a double wall, and a vacuum insulating material is accommodated in the double wall.

CITATION LIST

Patent Literature

PTL 1: Japanese Laid-Open Patent Application Publication No. 2007-126188

SUMMARY OF INVENTION

Technical Problem

For example, the transportation of medicine requires severe temperature management in which the medicine is maintained at low temperature for a predetermined period of time regardless of outside air temperature. On the other hand, the degree of vacuum of the above vacuum insulating material decreases due to aging degradation and the like, and the heat insulation performance of the vacuum heat insulating body deteriorates. Moreover, when the vacuum heat insulating body is broken by impact or mechanical external force, the heat insulation performance of the vacuum heat insulating body significantly deteriorates before the life ends by the aging degradation. However, it is difficult to, for example, visually determine the heat insulation performance of the vacuum heat insulating body based on appearance. Therefore, there is a case where the vacuum heat insulating body whose heat insulation performance is low is used for actual transportation, and a management temperature is not maintained.

The present disclosure was made to solve the above problems, and an object of the present disclosure is to provide a management system for vacuum heat insulating bodies by which vacuum heat insulating bodies that satisfy predetermined heat insulation performance can be continuously used.

Solution to Problem

A management system for a vacuum heat insulating body according to a first aspect of the present invention includes: an inspection device that inspects heat insulation performance of a vacuum heat insulating body; a storage portion that stores information regarding the inspected heat insulation performance; an estimating portion that estimates a remaining life, which is the rest of a life of the vacuum heat insulating body, from a time-lapse change of the heat insulation performance stored in the storage portion; and a determining portion that determines whether or not the remaining life is a predetermined period of time or more.

According to this configuration, before the life of the inspected vacuum heat insulating body ends, another vacuum heat insulating body that satisfies the predetermined heat insulation performance can be acquired based on the remaining life of the inspected vacuum heat insulating body. Moreover, the use of the vacuum heat insulating body that has been broken by impact or external force can be avoided by the inspection. Therefore, the vacuum heat insulating body that satisfies the predetermined heat insulation performance can be continuously used.

A management system for a vacuum heat insulating body according to a second aspect of the present invention is configured such that in the first aspect, the heat insulation performance is internal pressure of the vacuum heat insulating body. According to this configuration, the measurement of the pressure in the vacuum heat insulating body can be performed in a shorter time than the measurement of heat conductivity, heat flux, and temperature change. Therefore, the vacuum heat insulating body can be easily managed.

A management system for a vacuum heat insulating body according to a third aspect of the present invention is configured such that: in the first or second aspect, the vacuum heat insulating body includes a gas adsorbing member; the heat insulation performance of the vacuum heat insulating body changes through a first period in which a change rate of the heat insulation performance is constant and a second period which is continuous with the first period and in which the change rate is variable; and the life is the first period. According to this configuration, in the first period, before partial saturation of the gas adsorption amount starts, the gas adsorbing member adsorbs gas remaining in or having gotten into the vacuum heat insulating body. Thus, the pressure of the vacuum heat insulating body is suppressed to a low level, and the vacuum heat insulating body can satisfy the predetermined heat insulation performance.

A management system for a vacuum heat insulating body according to a fourth aspect of the present invention is configured such that: in the first or second aspect, the vacuum heat insulating body includes a gas adsorbing member; the heat insulation performance of the vacuum heat insulating body changes through a first period in which a change rate of the heat insulation performance is constant, a second period which is continuous with the first period and in which the change rate is variable, and a third period which is continuous with the second period and in which the change rate is constant; and the life is a total period including the first period and the second period.

According to this configuration, in the second period, before the gas adsorption amount is entirely saturated, the gas adsorbing member adsorbs gas remaining in or having gotten into the vacuum heat insulating body. Thus, the pressure of the vacuum heat insulating body is suppressed to a low level, and the vacuum heat insulating body can satisfy the predetermined heat insulation performance.

A management system for a vacuum heat insulating body according to a fifth aspect of the present invention is configured such that in any one of the first to third aspects, when the remaining life is less than the predetermined period of time, the determining portion determines a period that is the remaining life or less, as a usable period of the vacuum heat insulating body. According to this configuration, the vacuum heat insulating body can be systematically managed based on the usable period.

A management system for a vacuum heat insulating body according to a sixth aspect of the present invention is configured such that: in any one of the first to fifth aspects, the heat insulation performance is internal pressure of the vacuum heat insulating body; when the internal pressure of the vacuum heat insulating body is lower than first predetermined pressure, the determining portion determines that the vacuum heat insulating body is usable; when the internal pressure of the vacuum heat insulating body is the first predetermined pressure or higher and is lower than second predetermined pressure higher than the first predetermined pressure, the determining portion determines that the vacuum heat insulating body is usable this time but is unusable next time; and when the internal pressure of the vacuum heat insulating body is the second predetermined pressure or higher, the determining portion determines that the vacuum heat insulating body is unusable.

According to this configuration, while avoiding a case where the vacuum heat insulating body is found to be unusable immediately before the use of the vacuum heat insulating body this time, another vacuum heat insulating body can be prepared until next time. Therefore, the vacuum heat insulating body that satisfies the predetermined heat insulation performance can be continuously used.

A management system for a vacuum heat insulating body according to a seventh aspect of the present invention includes: in any one of the first to sixth aspects, an ordering portion that places an order for the vacuum heat insulating body based on a determination result of the determining portion; and an order receiving portion that receives the order. According to this configuration, another vacuum heat insulating body is ordered based on the remaining life of the vacuum heat insulating body. Therefore, the vacuum heat insulating body that satisfies the predetermined heat insulation performance can be continuously used.

A management system for a vacuum heat insulating body according to an eighth aspect of the present invention is configured such that in any one of the first to seventh aspects, the storage portion associates identification information of the inspection device with identification information of the vacuum heat insulating body inspected by the inspection device, and stores the identification information of the inspection device and the identification information of the vacuum heat insulating body. According to this configuration, the vacuum heat insulating body at the location of the inspection device and the location of the vacuum heat insulating body can be managed in an integrated way by the storage portion.

The above object, other objects, features, and advantages of the present disclosure will be made clear by the following detailed explanation of preferred embodiments with reference to the attached drawings.

DESCRIPTION OF EMBODIMENTS

Hereinafter, embodiments of the present disclosure will be specifically described with reference to the drawings. In the following description and the drawings, the same reference signs are used for the same or corresponding components, and the repetition of the same explanation is avoided.

Embodiment 1

Configuration of Management System for Vacuum Heat Insulating Body

Figure 1:
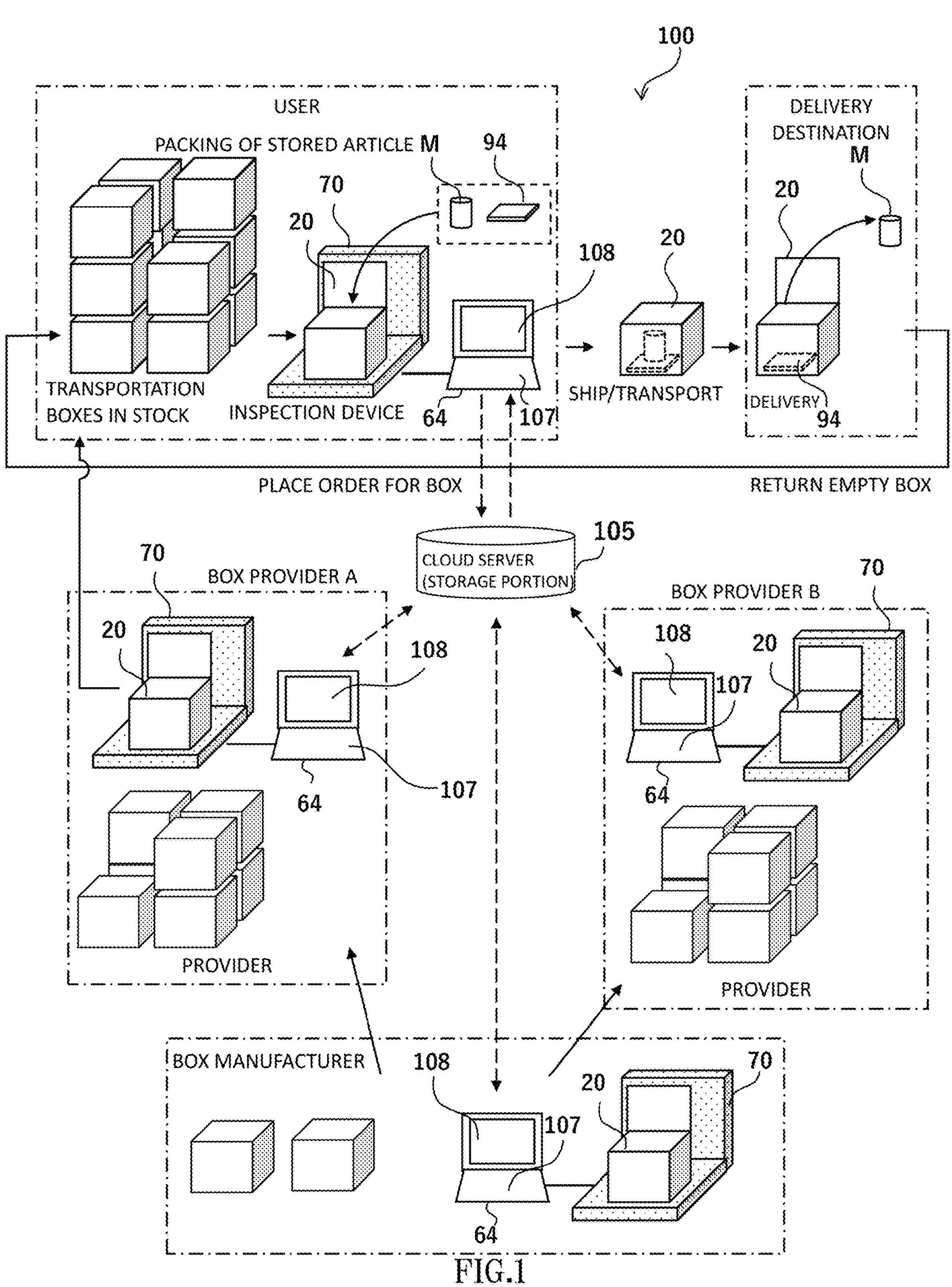
FIG. 1 is a diagram showing a management system for a vacuum heat insulating body according to Embodiment 1 of the present invention.

As shown in FIG. 1, a management system 100 for a vacuum heat insulating body 10 according to Embodiment 1 is a system that manages the vacuum heat insulating body 10 based on heat insulation performance of the vacuum heat insulating body 10. The following will describe a case where a transportation box 20 including the vacuum heat insulating body 10 is managed. However, the management system 100 for the vacuum heat insulating body 10 is not limited to this, and the management system 100 can manage the vacuum heat insulating body 10 itself or another product including the vacuum heat insulating body 10. Details of the vacuum heat insulating body 10 and the transportation box 20 will be described later.

Moreover, the following will describe a case where the management system 100 is shared by a user, a provider, and a manufacturer of the transportation box 20. However, the management system 100 may be shared by the user and the provider of the transportation box 20. Details of a method of managing the vacuum heat insulating body 10 using the management system 100 will be described later.

For example, the user is a delivery center that delivers articles M, such as medicine, and stores a fixed number of transportation boxes 20. The manufacturer is a company that manufactures the transportation boxes 20 and supplies the transportation boxes 20 to the provider.

The provider has a warehouse that stores the transportation boxes 20 and provides the transportation boxes 20 to the user. The provider may include providers (in an example of FIG. 1, box providers A and B). The providers exist at various places. In the example of FIG. 1, the provider A provides the transportation box 20 to the user. The manufacturer of the transportation box 20 may be the provider. Or, an intermediate trader such as a wholesaler, a rental trader, or a lease trader of the transportation box 20 may be the provider.

Figure 2:
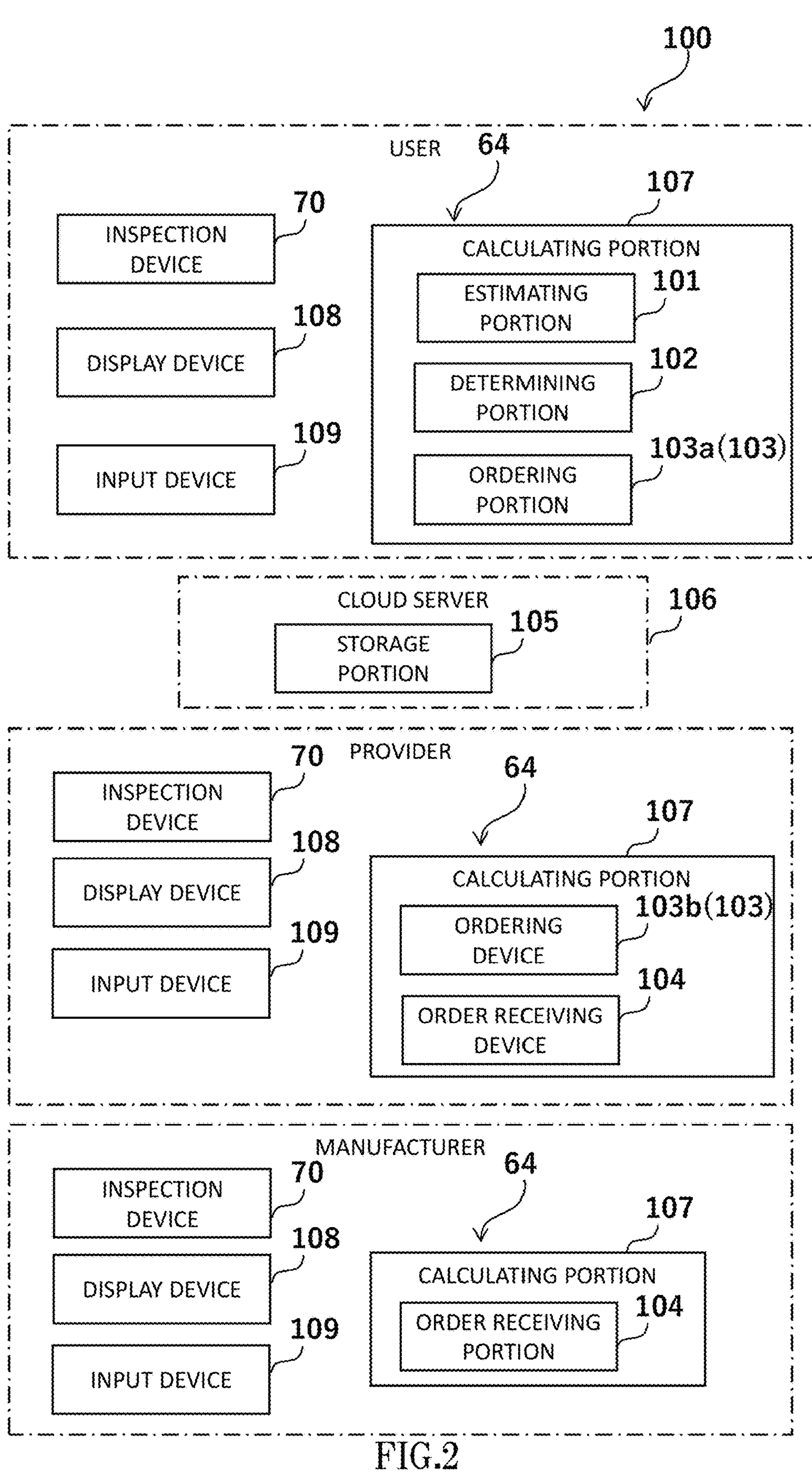
FIG. 2 is a functional block diagram showing the configuration of the management system for the vacuum heat insulating body of FIG. 1.

As shown in FIG. 2, the management system 100 includes an inspection device 70, an estimating portion 101, a determining portion 102, an ordering portion 103, an order receiving portion 104, and a cloud server 106. The ordering portion 103 includes an ordering portion 103*a* of the user and an ordering portion 103*b* of the provider. Moreover, the cloud server 106 includes a storage portion 105 such as a HDD (hard disc drive), and the storage portion 105 stores various information. For example, the inspection device 70 is provided at an inspection system 60 (FIG. 8) for the vacuum heat insulating body 10. Details of the inspection system 60 will be described later.

For example, the estimating portion 101, the determining portion 102, and the ordering portion 103*a* are provided at a computer 64 of the user. The ordering portion 103*b* is provided at a computer 64 of the provider. The order receiving portion 104 is provided at each of the computer 64 of the provider and a computer 64 of the manufacturer. The computer 64 includes a calculating portion 107 and is connected to the inspection device 70, a display device 108, and an input device 109. The calculating portion 107 is, for example, a processor such as a CPU, and constitutes the estimating portion 101, the determining portion 102, the ordering portion 103, and the order receiving portion 104. The display device 108 is, for example, a display and displays information output from the computer 64. The input device 109 includes, for example, a keyboard and a mouse and inputs information to the computer 64.

The estimating portion 101 estimates a remaining life, which is the rest of the life of the vacuum heat insulating body 10, from a time-lapse change of the heat insulation performance stored in the storage portion 105. The determining portion 102 determines whether or not the remaining life is a predetermined period of time or more. The ordering portion 103*a* of the user places an order for the vacuum heat insulating body 10 based on a determination result of the determining portion 102. The ordering portion 103*b* of the provider places an order for the vacuum heat insulating body 10 in accordance with an instruction from the provider using the input device 109. The order receiving portion 104 receives the order for the vacuum heat insulating body 10. A method of estimating the life of the vacuum heat insulating body 10 will be described later.

The calculating portion 107 of the user, the calculating portion 107 of the provider, and the calculating portion 107 of the manufacturer can access the storage portion 105 of the cloud server 106 through a network, such as the Internet. The storage portion 105 stores a management program of the vacuum heat insulating body 10 and information regarding the heat insulation performance of the vacuum heat insulating body 10 inspected by the inspection device 70. The calculating portion 107 executes the management program to control respective portions of the management system 100 and perform management processing of the vacuum heat insulating body 10. The storage portion 105 may be an internal memory, such as a RAM and a ROM, of the computer 64. Moreover, the storage portion 105 may be another storage medium that can access the calculating portion 107. Furthermore, the storage portion 105 may be a combination of at least two of an internal memory, another storage medium, and a server.

Configuration of Transportation Box

Figure 3:
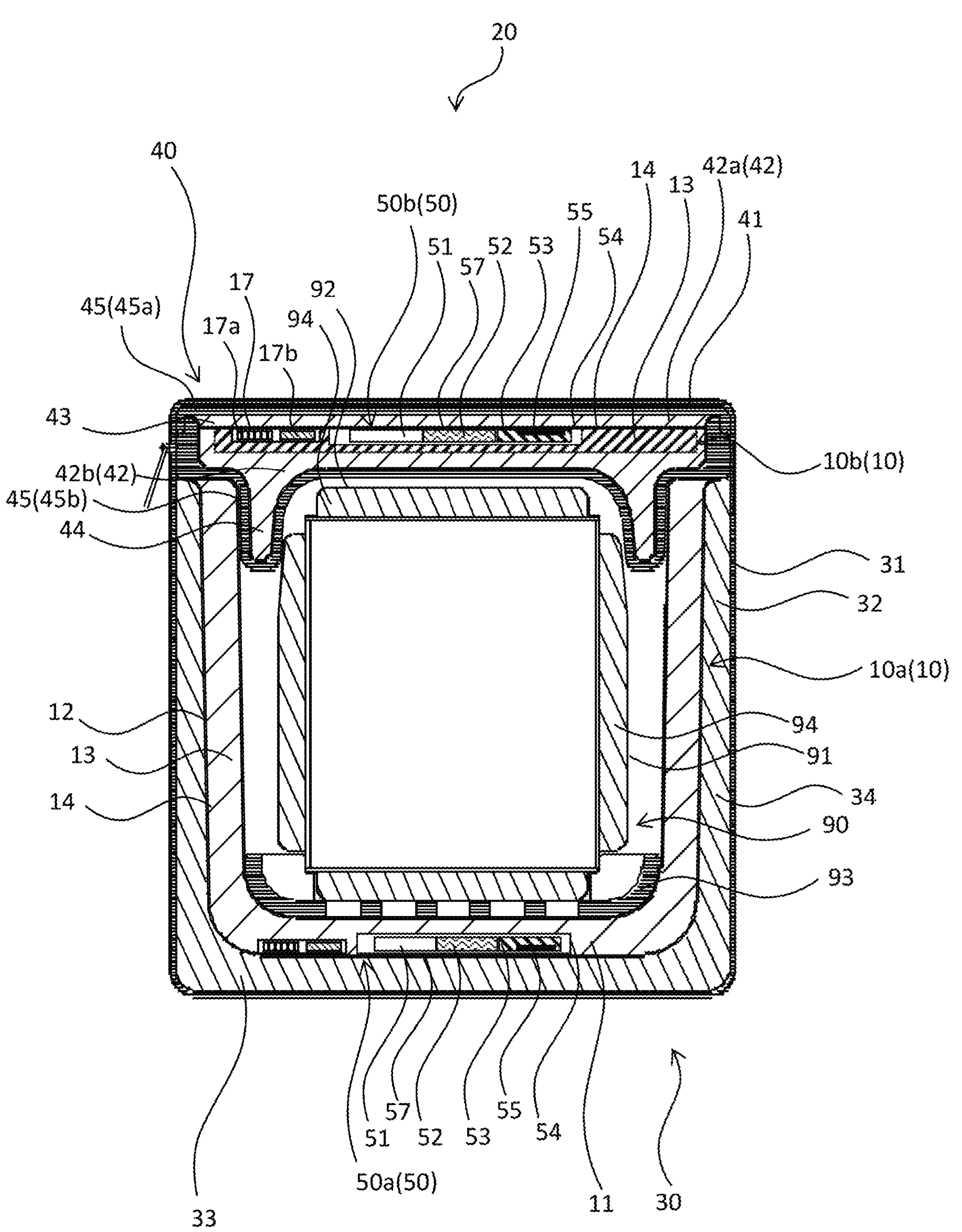
FIG. 3 is a sectional view schematically showing a transportation box including the vacuum heat insulating body of FIG. 1.
Figure 4:
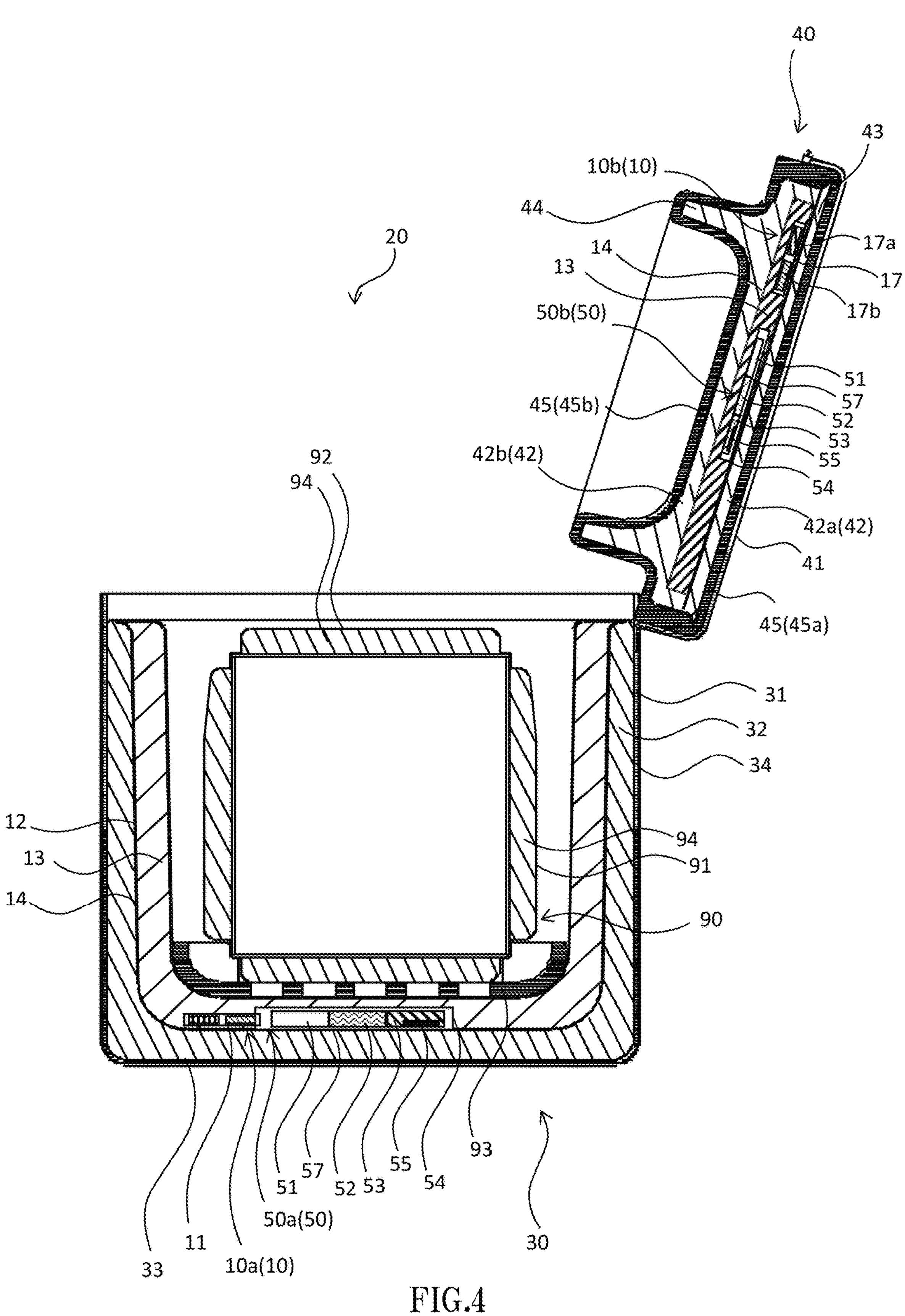
FIG. 4 is a sectional view schematically showing the transportation box including a heat retaining lid of FIG. 3 which is open.

As shown in FIGS. 3 and 4, for example, the vacuum heat insulating body 10 is used in the transportation box 20 that transports or stores an article, such as medicine, a specimen, or food. The following will describe a case where the vacuum heat insulating body 10 is used in the transportation box 20. However, the use of the vacuum heat insulating body 10 is not limited to this.

The transportation box 20 includes a heat retaining container 30 and a heat retaining lid 40. The heat retaining container 30 includes a first exterior member 31, a first protective layer 32, and a first vacuum heat insulating body 10*a*. The heat retaining lid 40 includes a second exterior member 41, a second protective layer 42, and a second vacuum heat insulating body 10*b*. Each of the first vacuum heat insulating body 10*a* and the second vacuum heat insulating body 10*b* may be simply referred to as the vacuum heat insulating body 10.

The heat retaining container 30 has, for example, a box shape including an internal space and an opening. The heat retaining lid 40 has, for example, a flat plate shape and can open or close the opening of the heat retaining container 30. In the heat retaining container 30, the first protective layer 32 is arranged inside the first exterior member 31. The first vacuum heat insulating body 10*a* is arranged inside the first protective layer 32. The internal space is located inside the first vacuum heat insulating body 10*a*. A side from the first exterior member 31 toward the first vacuum heat insulating body 10*a* is referred to as an inner side, and its opposite side is referred to as an outer side. Moreover, in a state where the heat retaining lid 40 closes the opening of the heat retaining container 30, a side from the heat retaining lid 40 toward the heat retaining container 30 is referred to as a lower side, and its opposite side is referred to as an upper side. However, the arrangement of the transportation box 20 is not limited to this.

The first exterior member 31 of the heat retaining container 30 has a box shape whose upper end is open. The first exterior member 31 of the heat retaining container 30 is made of a material, such as synthetic fiber cloth, plastic, or corrugated cardboard. The first protective layer 32 is accommodated inside the first exterior member 31, and the first exterior member 31 covers an outer surface of the first protective layer 32. For example, a handle may be attached to the first exterior member 31 such that the user can easily hold the transportation box 20.

The first protective layer 32 has, for example, a box shape whose upper end is open. The first protective layer 32 is made of a buffer material, such as styrene foam. The first vacuum heat insulating body 10*a* is accommodated inside the first protective layer 32. The first protective layer 32 covers an outer surface of the first vacuum heat insulating body 10*a*. With this, the first vacuum heat insulating body 10*a* and the article are prevented from being damaged by impact, vibration, and the like from an outside.

The first protective layer 32 includes a first lower wall 33 and four first side walls 34. Each of the first lower wall 33 and the first side walls 34 has a rectangular flat plate shape. The first lower wall 33 is located at a lower end of the first protective layer 32. The four first side walls 34 extend upward from an outer peripheral edge of the first lower wall 33, and the adjacent first side walls 34 are connected to each other. The four first side walls 34 are formed in a square tube shape whose lower end opening is closed by the first side wall 34.

The first vacuum heat insulating body 10*a* has a box shape whose upper end is open. The first vacuum heat insulating body 10*a* includes a second lower wall 11 and four second side walls 12. Each of the second lower wall 11 and the second side walls 12 has a rectangular flat plate shape. The second lower wall 11 is located at a lower end of the first vacuum heat insulating body 10*a*. For example, the four second side walls 12 extend upward from an outer peripheral edge of the second lower wall 11, and the adjacent second side walls 12 are connected to each other. The four second side walls 12 are formed in a square tube shape whose lower end opening is closed by the second lower wall 11.

As above, an outer surface of the heat retaining container 30 is formed by an outer surface of the first exterior member 31, and an inner surface of the heat retaining container 30 is formed by an inner surface of the first vacuum heat insulating body 10*a*. An upper end opening of the heat retaining container 30 corresponds to an upper end opening of the first vacuum heat insulating body 10*a*, and the internal space of the heat retaining container 30 corresponds to an internal space of the first vacuum heat insulating body 10*a*. This internal space has a rectangular solid shape surrounded by the second lower wall 11 and the four second side walls 12 of the vacuum heat insulating body 10*a* and communicates with an outside through the upper end opening.

The heat retaining lid 40 includes a covering portion 43 and a projecting portion 44. The covering portion 43 has a rectangular flat plate shape. The covering portion 43 includes: a lower surface opposed to the upper end opening of the heat retaining container 30; and an upper surface that is located at an opposite side of the lower surface. The projecting portion 44 projects from a lower surface of the covering portion 43 and has a square tube shape whose upper end opening is closed by the covering portion 43. The projecting portion 44 includes an inner peripheral surface at the inner side and an outer peripheral surface at its opposite side.

As shown in FIG. 3, when the heat retaining lid 40 closes the upper end opening of the heat retaining container 30, the lower surface of the covering portion 43 is brought into contact with the upper end of the first protective layer 32 and the upper end of the first vacuum heat insulating body 10*a*. Moreover, the projecting portion 44 is fitted to an inner side of the first vacuum heat insulating body 10*a*, and the outer peripheral surface of the projecting portion 44 is brought into contact with the inner surface of the first vacuum heat insulating body 10*a* or is spaced apart but close to the inner surface of the first vacuum heat insulating body 10*a*.

The heat retaining lid 40 is formed by the second exterior member 41 and the second protective layer 42. The second vacuum heat insulating body 10*b* is located at the covering portion 43 of the heat retaining lid 40. Therefore, the covering portion 43 includes the second exterior member 41, the second protective layer 42, and the second vacuum heat insulating body 10*b*, and the projecting portion 44 includes the second exterior member 41 and the second protective layer 42.

The second exterior member 41 covers an outer surface of the second protective layer 42. The second exterior member 41 is connected to the upper end of the first exterior member 31 such that the heat retaining lid 40 can open or close the upper end opening of the heat retaining container 30. The second protective layer 42 is made of a buffer material, such as styrene foam or flexible urethane foam. When the second protective layer 42 is made of flexible urethane foam, the sealing property of the heat retaining lid 40 with respect to the heat retaining container 30 can be improved.

The second vacuum heat insulating body 10*b* has, for example, a rectangular flat plate shape and is located inside the covering portion 43. In the covering portion 43, the entire second vacuum heat insulating body 10*b* is covered with the second protective layer 42. However, the arrangement of the second vacuum heat insulating body 10*b* is not limited to this. For example, the second vacuum heat insulating body 10*b* may be located in a recess that is recessed from the upper surface of the second protective layer 42, and the second vacuum heat insulating body 10*b* may be arranged so as to be exposed from the recess. In this case, a part of the second vacuum heat insulating body 10*b* is covered with the second protective layer 42, and the rest of the second vacuum heat insulating body 10*b* is covered with the second exterior member 41.

Configuration of Vacuum Heat Insulating Body

Figure 5:
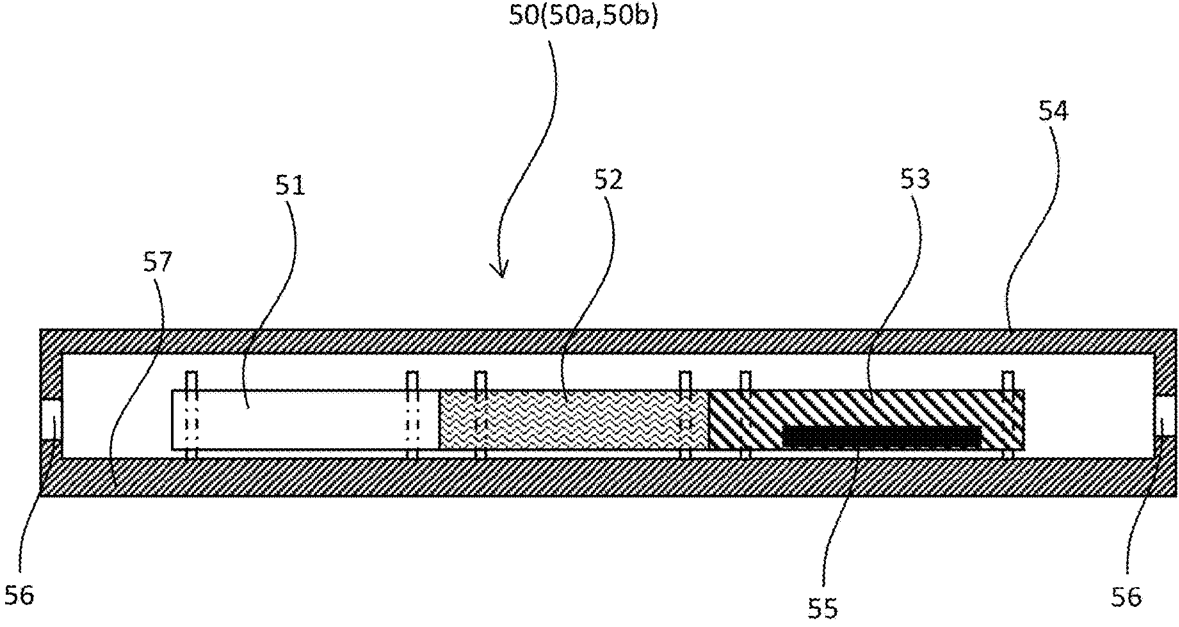
FIG. 5 is a sectional view schematically showing a wireless vacuum gauge device of FIG. 3.

As shown in FIGS. 3 and 4, the vacuum heat insulating body 10 includes: the first vacuum heat insulating body 10*a* located in the heat retaining container 30; and the second vacuum heat insulating body 10*b* located in the heat retaining lid 40. The vacuum heat insulating body 10 includes a core member 13, an outer covering member 14, a gas adsorbing member 17, and a wireless vacuum gauge device 50. FIG. 5 is a sectional view schematically showing the wireless vacuum gauge device 50.

The core member 13 is a porous body and is made of a material having low heat conductivity. The core member 13 serves as a frame of the vacuum heat insulating body 10 and forms a heat insulating space. Examples of the core member 13 include: an open-cell body, such as open-cell urethane foam; a foamed resin material, such as styrene foam; a fiber assembly; and an inorganic fine particle assembly. The open-cell urethane foam is polyurethane including open cells that are cells communicating with each other.

The outer covering member 14 is made of a nonmetal material, such as resin, and has a gas barrier property. The outer covering member 14 maintains internal pressure of the vacuum heat insulating body 10 such that the internal pressure is lower than atmospheric pressure. For example, the outer covering member 14 may have a layered structure including: a thermoplastic resin layer that can be thermally welded; an air barrier layer made of ethylene-vinyl alcohol copolymer (EVOH), polyvinyl alcohol polymer, or the like; and a steam barrier layer made of polypropylene or the like. The core member 13, the gas adsorbing member 17, and the wireless vacuum gauge device 50 are accommodated in a depressurized internal portion of the outer covering member 14. The outer covering member 14 covers and seals the core member 13, the gas adsorbing member 17, and the wireless vacuum gauge device 50.

The gas adsorbing member 17 adsorbs gas, such as air and steam remaining inside or having gotten into the outer covering member 14. For example, the gas adsorbing member 17 includes: an air adsorbing member 17*a* that adsorbs air; and a steam adsorbing member 17*b* that adsorbs steam. These adsorbing members are not especially specified, and calcium oxide, magnesium oxide, zeolite, and a mixture of these can be used. The internal pressure of the outer covering member 14 is maintained low and the degree of vacuum is maintained high by the gas adsorbing member 17.

The gas adsorbing member 17 includes: a first gas adsorbing member located at the first vacuum heat insulating body 10*a*; and a second gas adsorbing member located at the second vacuum heat insulating body 10*b*. The first gas adsorbing member is located in a recess that is recessed from a lower surface of the core member 13 of the first vacuum heat insulating body 10*a*, and the second gas adsorbing member is located in a recess that is recessed from an upper surface of the core member 13 of the second vacuum heat insulating body 10*b*.

The wireless vacuum gauge device 50 includes: a first wireless vacuum gauge device 50*a* located at the first vacuum heat insulating body 10*a*; and a second wireless vacuum gauge device 50*b* located at the second vacuum heat insulating body 10*b*. As shown in FIG. 4, the wireless vacuum gauge device 50 includes a pressure sensor 51, a transmitting portion 52, an electric power supply portion 53, and a casing 54.

The pressure sensor 51 is a sensor that detects the internal pressure (air pressure) of the outer covering member 14. The pressure sensor 51 is electrically connected to the transmitting portion 52 and outputs detected pressure (inspection pressure) to the transmitting portion 52. Used as the pressure sensor 51 is, for example, a sensor that includes a heater and a thermocouple and measures the air pressure (degree of vacuum) by measuring peripheral heat conductivity characteristics from a temperature detected by the thermocouple when the heater is heated. However, the pressure sensor 51 is not limited to this, and a micro electro mechanical system (MEMS) of a piezoelectric type, an electrostatic capacitance type, a vibration type, or the like is used.

The transmitting portion 52 is an element that transmits the inspection pressure of the pressure sensor 51 through wireless communication. The transmitting portion 52 includes, for example, a communication control IC, a memory, and an antenna. The transmitting portion 52 stores its own identification information (transmitting portion ID) in the memory, and the communication control IC transmits the transmitting portion ID together with the inspection pressure through the antenna. For example, the transmitting portion 52 transmits the inspection pressure through NFC (Near Field Communication) that uses a frequency of 13.56 MHz band. With this, when the transmitting portion 52 gets close to a receiving portion located within a range of a predetermined distance (for example, 10 cm or less), the receiving portion can receive the inspection pressure of the pressure sensor 51 from the transmitting portion 52.

The electric power supply portion 53 is electrically connected to the pressure sensor 51 and the transmitting portion 52 and supplies electric power to the pressure sensor 51 and the transmitting portion 52. For example, the electric power supply portion 53 includes an electric power supply control IC and a power receiving portion for magnetic resonance wireless electric power supply. The power receiving portion includes a secondary coil (electric power receiving coil 55) that receives electric power in a non-contact manner from a primary coil (electric power transmitting coil) located outside the outer covering member 14. The electric power receiving coil 55 is such a coil that a conducting wire is wound around a central axis. Examples of the electric power receiving coil 55 include a solenoid coil and a spiral coil. The electric power receiving coil 55 receives electric power transmitted from the electric power transmitting coil, and the electric power supply control IC supplies this electric power to the pressure sensor 51 and the transmitting portion 52. Since a battery is not used for the electric power supply to the pressure sensor 51 and the transmitting portion 52 as above, the liquid leakage of the battery by a depressurized state does not occur. Thus, the deterioration of the degree of vacuum of the vacuum heat insulating body 10 by the liquid leakage can be suppressed, and a case where electric power supply cannot be performed by the liquid leakage can be suppressed.

The casing 54 is made of a nonmetal, such as resin. The pressure sensor 51, the transmitting portion 52, and the electric power supply portion 53 are accommodated in the casing 54. The casing 54 is located inside the outer covering member 14. The casing 54 includes an internal space and through holes 56. Since air in the casing 54 is discharged through the through holes 56, the pressure inside the casing 54 and the pressure outside the casing 54 in the outer covering member 14 are equal to each other. Moreover, the space in the casing 54 may be subjected to potting with resin to protect circuit components. Even in this case, the pressure sensor 51 and the through holes 56 are not filled with resin, and the pressure inside the casing 54 and the pressure outside the casing 54 which are detected by the pressure sensor 51 are made equal to each other.

The casing 54 has, for example, a flat plate shape and includes a pair of opposing walls and four walls connecting these opposing walls. One of the pair of walls (i.e., a fixed wall 57) is flat. The pressure sensor 51, the transmitting portion 52, and the electric power supply portion 53 are attached to the fixed wall 57 so as to be lined up. Therefore, a dimension between the pair of walls (i.e., the thickness of the casing 54) in a direction orthogonal to the fixed wall 57 can be made small. Thus, without increasing the thickness of the vacuum heat insulating body 10, the thickness of the core member 13 overlapping the casing 54 of the wireless vacuum gauge device 50 can be made large, and the deterioration of the heat insulation performance of the vacuum heat insulating body 10 by the wireless vacuum gauge device 50 can be suppressed.

The wireless vacuum gauge device 50 does not have to include a part of the casing 54, or the wireless vacuum gauge device 50 does not have to include the entire casing 54. For example, in the wireless vacuum gauge device 50, the circuit components that need to be protected are subjected to the potting with resin, and with this, a circuit substrate is covered with the resin. Thus, the wireless vacuum gauge device 50 does not have to include the casing 54. Or, the wireless vacuum gauge device 50 may include the casing 54 that accommodates at least a part of the pressure sensor 51, at least a part of the transmitting portion 52, and at least a part of the electric power supply portion 53. With this, the thickness of the wireless vacuum gauge device 50 can be further reduced, and the deterioration of the heat insulation performance of the vacuum heat insulating body 10 can be further suppressed.

As shown in FIGS. 3 and 4, the first vacuum heat insulating body 10*a* includes the recess that is recessed from the lower surface of the core member 13, and the first wireless vacuum gauge device 50*a* is located in the recess. The fixed wall 57 of the first wireless vacuum gauge device 50*a* and the lower surface of the core member 13 are arranged so as to be flush with each other and are covered with the outer covering member 14. In this case, the electric power receiving coil 55 is attached to the fixed wall 57 so as to be in parallel with and opposed to the fixed wall 57 such that the central axis of the electric power receiving coil 55 of the electric power supply portion 53 extends in the direction orthogonal to the fixed wall 57. Therefore, the electric power receiving coil 55 is located so as to be in parallel with the lower surface of the first vacuum heat insulating body 10*a*.

The second vacuum heat insulating body 10*b* includes the recess that is recessed from the upper surface of the core member 13, and the second wireless vacuum gauge device 50*b* is located in the recess. The fixed wall 57 of the second wireless vacuum gauge device 50*b* and the upper surface of the core member 13 are arranged so as to be flush with each other, and are covered with the outer covering member 14. In this case, the electric power receiving coil 55 is attached to the fixed wall 57 so as to be in parallel with and opposed to the fixed wall 57 such that the central axis of the electric power receiving coil 55 of the electric power supply portion 53 extends in the direction orthogonal to the fixed wall 57. Therefore, the electric power receiving coil 55 is located so as to be in parallel with the upper surface of the second vacuum heat insulating body 10*b*.

Method of Manufacturing First Vacuum Heat Insulating Body

Figure 6:
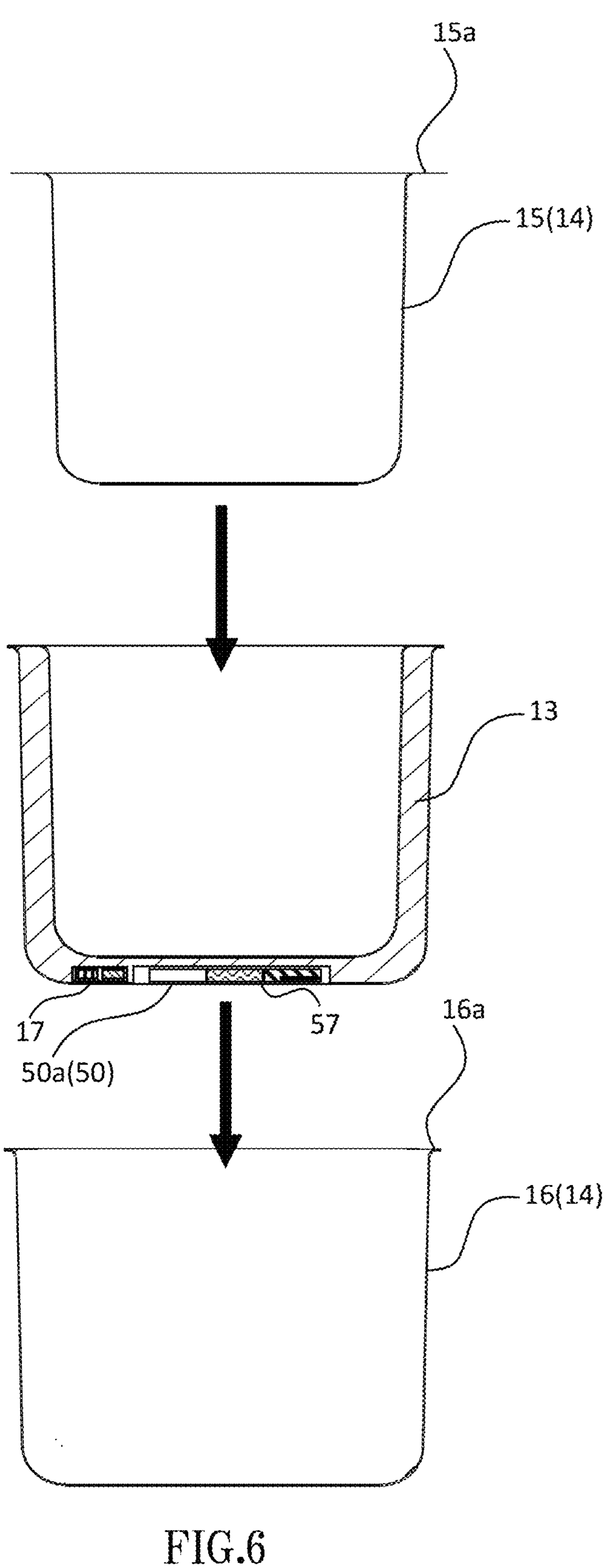
FIG. 6 is a sectional view schematically showing an inside member, a core member, and an outside member of a first vacuum heat insulating body of FIG. 3.

As shown in FIG. 6, the outer covering member 14 of the first vacuum heat insulating body 10*a* includes an inside member 15 and an outside member 16. Each of the inside member 15 and the outside member 16 has a box shape whose upper end is open. The inside member 15 includes a flange portion 15*a* surrounding the periphery of an upper end opening thereof, and the outside member 16 includes a flange portion 16*a* surrounding the periphery of an upper end opening thereof. Each of the inside member 15 and the outside member 16 is formed in a predetermined shape by vacuum forming, pressure forming, blow forming, or the like. The core member 13 is formed in a box shape whose upper end is open, in such a manner that a urethane liquid is poured into a mold, and open-cell urethane foam formed by foaming of the urethane liquid is released from the mold. At this time, two recesses that are recessed from the lower surface of the core member 13 are formed.

The first wireless vacuum gauge device 50*a* is fitted in the recess of the core member 13 such that the fixed wall 57 of the first wireless vacuum gauge device 50*a* is exposed from the recess. Moreover, the gas adsorbing member 17 is fitted in the other recess of the core member 13. Then, these are accommodated in the outside member 16, and the inside member 15 is accommodated in the core member 13. With this, the core member 13, the first wireless vacuum gauge device 50*a*, and the gas adsorbing member 17 are accommodated in a heat insulating space between the outside member 16 and the inside member 15, and the flange portion 15*a* of the inside member 15 overlaps the flange portion 16*a* of the outside member 16.

Figure 7:
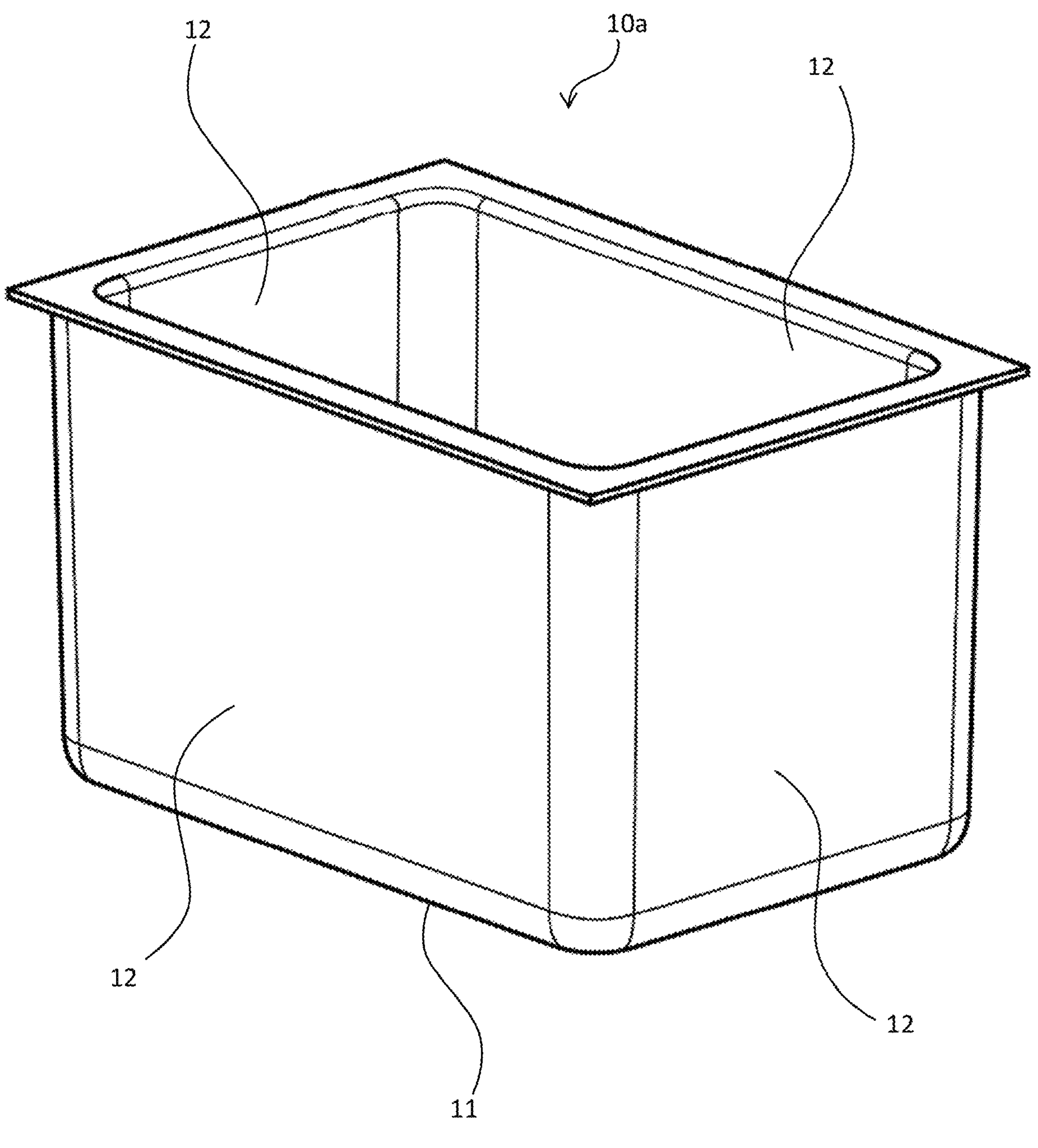
FIG. 7 is a perspective view showing the first vacuum heat insulating body of FIG. 3.

The flange portion 16*a* and the flange portion 15*a* are welded to each other, and the heat insulating space is subjected to vacuum drawing through an opening formed on the inside member 15 or the outside member 16. With this, the heat insulating space is depressurized. Thus, the inside member 15 and the outside member 16 tightly contacts the core member 13, and the outside member 16 tightly contacts the fixed wall 57 of the first wireless vacuum gauge device 50*a*. Then, the outer covering member 14 is sealed by sealing the opening with a sealant. With this, the first vacuum heat insulating body 10*a* which is shown in FIG. 7 and whose internal pressure is lower than atmospheric pressure is manufactured.

Inspection System for Vacuum Heat Insulating Body

Figure 8:
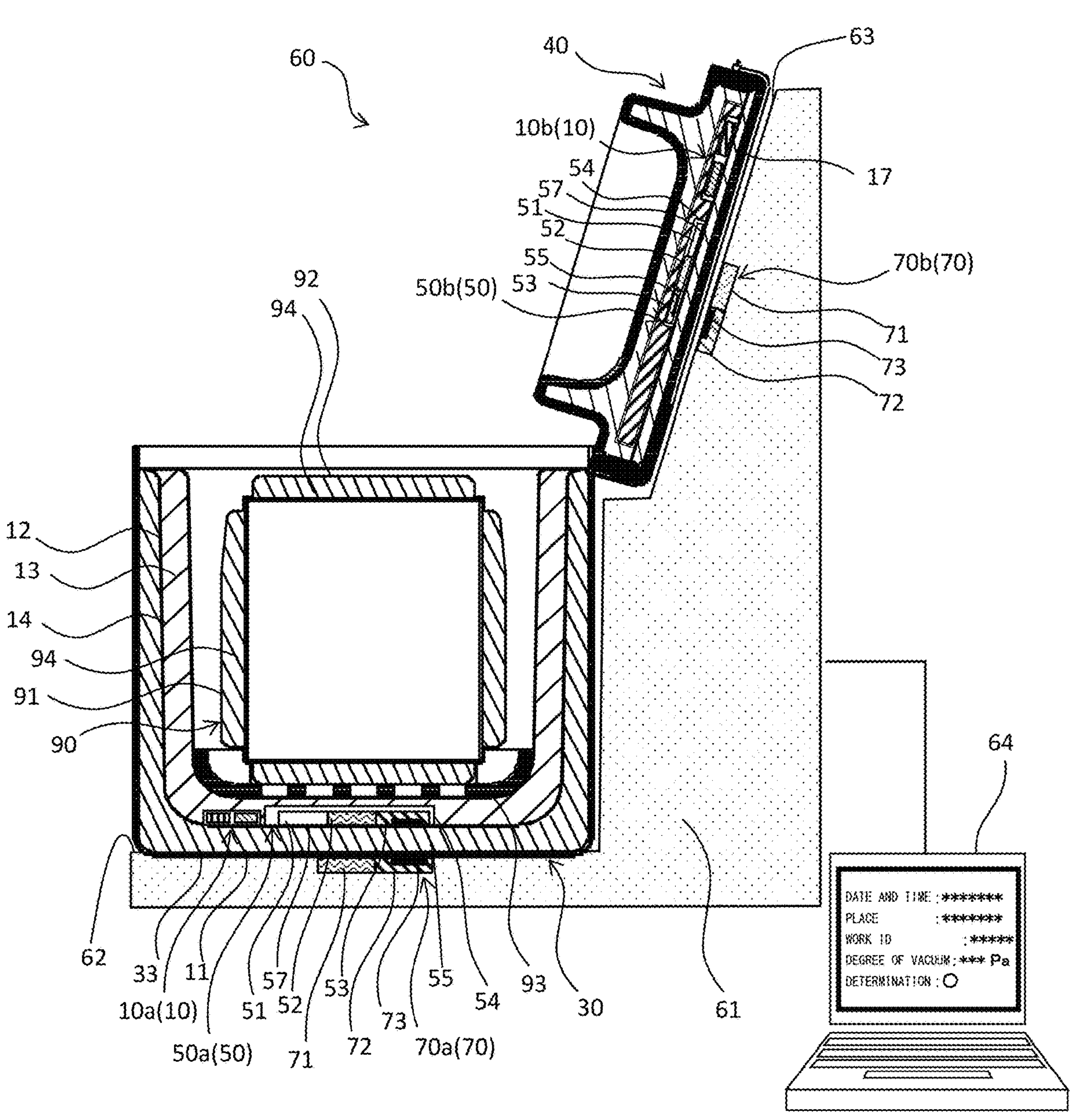
FIG. 8 is a diagram showing an inspection system for the vacuum heat insulating body of FIG. 3.

As shown in FIG. 8, the inspection system 60 for the vacuum heat insulating body 10 includes the inspection device 70 and a base 61. The inspection device 70 includes a receiving portion 71 and an electric power transmitting portion 72 and inspects the internal pressure (degree of vacuum) of the vacuum heat insulating body 10 as the heat insulation performance. The inspection device 70 is located outside the outer covering member 14 of the vacuum heat insulating body 10 and is connected to the computer 64.

The receiving portion 71 includes a communication control IC, a memory, and an antenna. The receiving portion 71 stores its own identification information (receiving portion ID) in the memory, and the communication control IC outputs the own receiving portion ID to the computer 64 together with information received from the transmitting portion 52 of the wireless vacuum gauge device 50. The computer 64 displays on the display device 108 the information from the receiving portion 71 and stores the information in the storage portion 105. As above, the receiving portion 71 and the transmitting portion 52 constitute a wireless communication unit.

The electric power transmitting portion 72 includes an electric power transmitting coil 73 and drives to transmit electric power to the electric power supply portion 53 of the wireless vacuum gauge device 50. The electric power transmitting coil 73 is such a coil that a conducting wire is wound around a central axis. Examples of the electric power transmitting coil 73 include a solenoid coil and a spiral coil. The driving of the electric power transmitting portion 72 is controlled by the computer 64. As above, the electric power transmitting portion 72 and the electric power supply portion 53 constitute a wireless electric power supply unit.

For example, the base 61 includes: a first placement surface 62 on which the heat retaining container 30 is placed; and a second placement surface 63 on which the heat retaining lid 40 is placed. For example, the first placement surface 62 is arranged horizontally and is opposed to a lower surface of the heat retaining container 30 placed on the first placement surface 62. The second placement surface 63 is inclined relative to the first placement surface 62 so as to be opposed to an upper surface of the heat retaining lid 40 that has opened the upper end opening of the heat retaining container 30 placed on the first placement surface 62.

The inspection device 70 includes a first inspection device 70*a* and a second inspection device 70*b*. The first inspection device 70*a* inspects the degree of vacuum of the first vacuum heat insulating body 10*a* of the heat retaining container 30 placed on the first placement surface 62. The second inspection device 70*b* inspects the degree of vacuum of the second vacuum heat insulating body 10*b* of the heat retaining lid 40 placed on the second placement surface 63. With this, the degree of vacuum of the first vacuum heat insulating body 10*a* and the degree of vacuum of the second vacuum heat insulating body 10*b* can be easily inspected by the first inspection device 70*a* and the second inspection device 70*b* without changing the arrangement of the transportation box 20.

The first inspection device 70*a* is located on the first placement surface 62 such that the fixed wall 57 of the first wireless vacuum gauge device 50*a* is opposed to the first inspection device 70*a* when the heat retaining container 30 is placed on the first placement surface 62. For example, the first placement surface 62 includes a recess, and the first inspection device 70*a* is accommodated in the recess. When the heat retaining container 30 is placed on the first placement surface 62, the fixed wall 57 of the first inspection device 70*a* is located in parallel with the first placement surface 62. As with the arrangement of the first inspection device 70*a* of the heat retaining container 30 on the first placement surface 62, the second inspection device 70*b* of the heat retaining lid 40 is arranged on the second placement surface 63.

Moreover, the first inspection device 70*a* is located on the first placement surface 62 so as to overlap at least a part of the wireless vacuum gauge device 50 when viewed in the direction orthogonal to the fixed wall 57. Herein, in the first inspection device 70*a*, the receiving portion 71 is opposed to the transmitting portion 52 so as to overlap at least a part of the transmitting portion 52 when viewed in the direction orthogonal to the fixed wall 57, and the electric power transmitting coil 73 of the electric power transmitting portion 72 is opposed to the electric power receiving coil 55 so as to overlap at least a part of the electric power receiving coil 55 of the electric power supply portion 53 when viewed in the direction orthogonal to the fixed wall 57. As with the arrangement of the first inspection device 70*a* on the first placement surface 62, the second inspection device 70*b* is arranged on the second placement surface 63.

Method of Inspecting Vacuum Heat Insulating Body

When the inspection system 60 inspects the vacuum heat insulating body 10, the transportation box 20 is arranged on the first placement surface 62, and the heat retaining lid 40 is open toward the second placement surface 63. With this, the first vacuum heat insulating body 10*a* of the transportation box 20 is opposed to the first inspection device 70*a* of the first placement surface 62, and the second vacuum heat insulating body 10*b* of the heat retaining lid 40 is opposed to the second inspection device 70*b* of the second placement surface 63.

The transmitting portion 52 of the vacuum heat insulating body 10*a* is opposed to the receiving portion 71 of the inspection device 70*a*, and the transmitting portion 52 of the vacuum heat insulating body 10*b* is opposed to the receiving portion 71 of the inspection device 70*b*. Moreover, the electric power receiving coil 55 of the electric power supply portion 53 of the vacuum heat insulating body 10*a* is opposed to the electric power transmitting coil 73 of the electric power transmitting portion 72 of the inspection device 70*a*, and the electric power receiving coil 55 of the electric power supply portion 53 of the vacuum heat insulating body 10*b* is opposed to the electric power transmitting coil 73 of the electric power transmitting portion 72 of the inspection device 70*b*. Then, the computer 64 controls the electric power transmitting portion 72 such that an alternating current flows through the electric power transmitting coil 73. With this, a magnetic field is generated at the electric power transmitting coil 73. Then, the electric power receiving coil 55 resonates at the same frequency as the vibration of the magnetic field, and electric power is transmitted from the electric power transmitting coil 73 to the electric power receiving coil 55.

At this time, the electric power receiving coil 55 and the electric power transmitting coil 73 are opposed to each other through the nonmetal outer covering member 14, the nonmetal second lower wall 11, the nonmetal first lower wall 33, and the like. Since a metal does not exist between the electric power receiving coil 55 and the electric power transmitting coil 73, the electric power receiving coil 55 can efficiently and safely receive electric power from the electric power transmitting coil 73 while suppressing electric power loss, abnormal heat generation, and the like by an eddy current.

Moreover, the electric power receiving coil 55 uses a magnetic resonance method when receiving electric power. Therefore, the electric power receiving coil 55 can receive electric power from the electric power transmitting coil 73 located away from the electric power receiving coil 55 by several centimeters. On this account, with the vacuum heat insulating body 10 covered with the protective layer 32, 42 and the exterior member 31, 41, the electric power receiving coil 55 can receive electric power from the electric power transmitting coil 73. Thus, the degree of vacuum of the vacuum heat insulating body 10 can be easily inspected without detaching the protective layer 32, 42 and the exterior member 31, 41 from the vacuum heat insulating body 10.

Furthermore, the electric power transmitting coil 73 is attached in parallel with a surface of the inspection device 70*a*, 70*b* exposed from the recess of the placement surface 62, 63 such that a central axis of the electric power transmitting coil 73 is orthogonal to the surface of the inspection device 70*a*, 70*b*. Moreover, the electric power receiving coil 55 is attached in parallel with the fixed wall 57 of the casing 54. With this, the electric power transmitting coil 73 and the electric power receiving coil 55 are parallel to each other, close to each other, and opposed to each other. Therefore, the deterioration of the electric power supply efficiency due to the inclination of the electric power receiving coil 55 relative to the electric power transmitting coil 73 is suppressed. Thus, the electric power receiving coil 55 can efficiently receive electric power.

Next, the electric power supply portion 53 supplies the electric power, received by the electric power receiving coil 55, to the pressure sensor 51 and the transmitting portion 52. Since the electric power supply portion 53 receives the electric power as above each time the inspection is performed, power shortage does not occur unlike a battery, and the inspection of the vacuum heat insulating body 10 can be performed for a long period of time.

Then, the pressure sensor 51 detects the pressure of the vacuum heat insulating body 10 and outputs the pressure to the transmitting portion 52, and the transmitting portion 52 transmits the inspection pressure and its own transmitting portion ID. With this, the receiving portion 71 receives the inspection pressure and the transmitting portion ID and outputs these and its own receiving portion ID to the computer 64.

At this time, since the receiving portion 71 communicates with the transmitting portion 52 through the nonmetal outer covering member 14 and the like, the deterioration of the communication efficiency by the outer covering member 14 can be suppressed, and the inspection pressure can be received from the transmitting portion 52 in a short period of time. Moreover, since the NFC is used for the communication between the receiving portion 71 and the transmitting portion 52, pairing of the transmitting portion 52 and the receiving portion 71 is unnecessary, and the receiving portion 71 can quickly receive the inspection pressure.

Next, the calculating portion 107 of the computer 64 associates the inspection pressure, the transmitting portion ID, the receiving portion ID, and an inspection date and time, stores these in the storage portion 105, and displays these on the display device 108. Since the transmitting portion 52 corresponds to the vacuum heat insulating body 10 one-to-one, the vacuum heat insulating body 10 can be identified by the transmitting portion ID. Moreover, the degree of vacuum of the vacuum heat insulating body 10 can be determined from the inspection pressure. Furthermore, since the receiving portion 71 corresponds to the inspection device 70 one-to-one, the inspection device 70 (inspection place) can be identified by the receiving portion ID. Therefore, the degree of vacuum of the vacuum heat insulating body 10 and the inspection place can be managed by the inspection pressure, the transmitting portion ID, and the receiving portion ID.

As above, since the vacuum heat insulating body 10 includes the wireless vacuum gauge device 50, the degree of vacuum (heat insulation performance) of the vacuum heat insulating body 10 can be measured in a non-contact manner. With this, the breakage of the vacuum heat insulating body 10 by the contact of an inspection unit, such as a heat flux sensor or a temperature sensor, with the vacuum heat insulating body 10 can be suppressed. Moreover, by using the pressure sensor 51, the degree of vacuum of the vacuum heat insulating body 10 can be measured in a short time, such as one second, which is shorter than an inspection time (for example, several minutes to several tens of minutes) of the inspection unit, such as the heat flux sensor.

Method of Estimating Life

Figure 9:
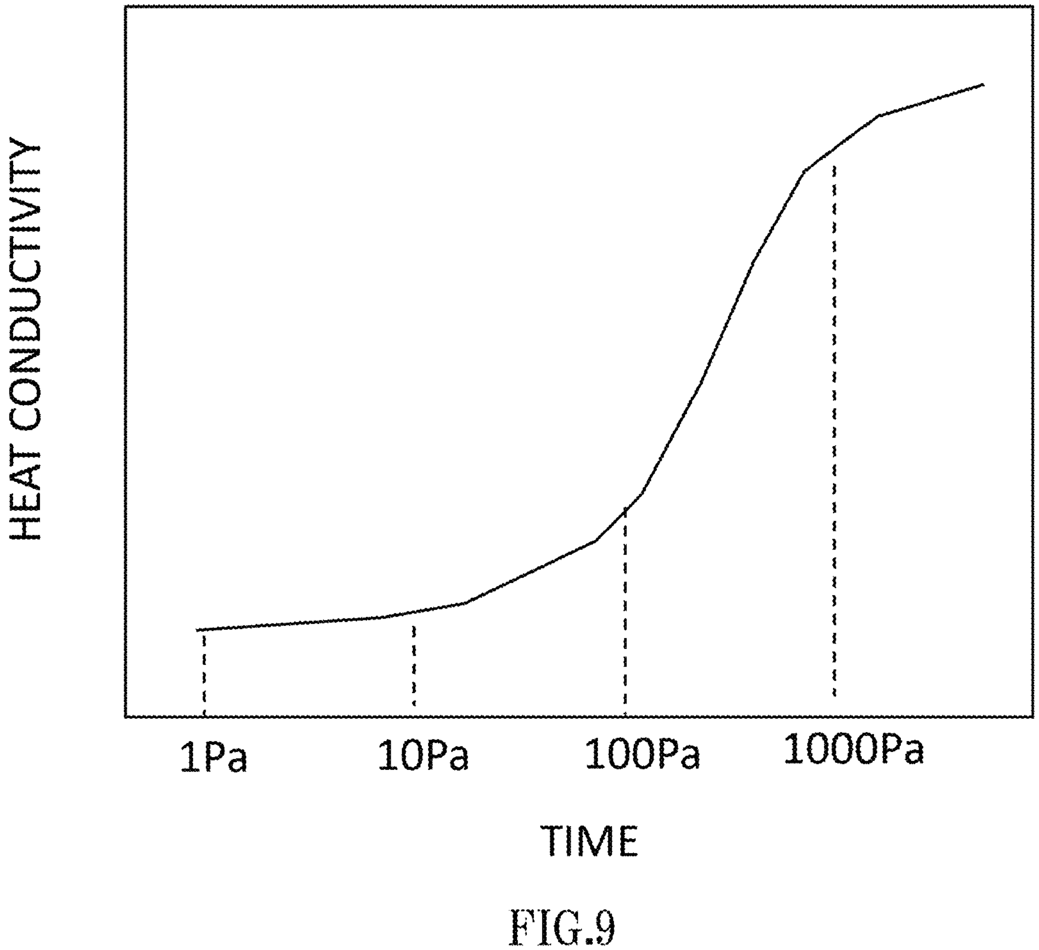
FIG. 9 is a graph showing a relation between heat conductivity and pressure of the vacuum heat insulating body of FIG. 3.

As shown in a graph of FIG. 9, the heat conductivity of the vacuum heat insulating body 10 and the internal pressure of the vacuum heat insulating body 10 are associated with each other one-to-one. The amount of gas that transfers heat decreases as the pressure decreases. Therefore, the heat conductivity decreases, and the heat insulation performance improves. As above, the heat conductivity and the pressure represent the heat insulation performance of the vacuum heat insulating body 10.

Figure 10:
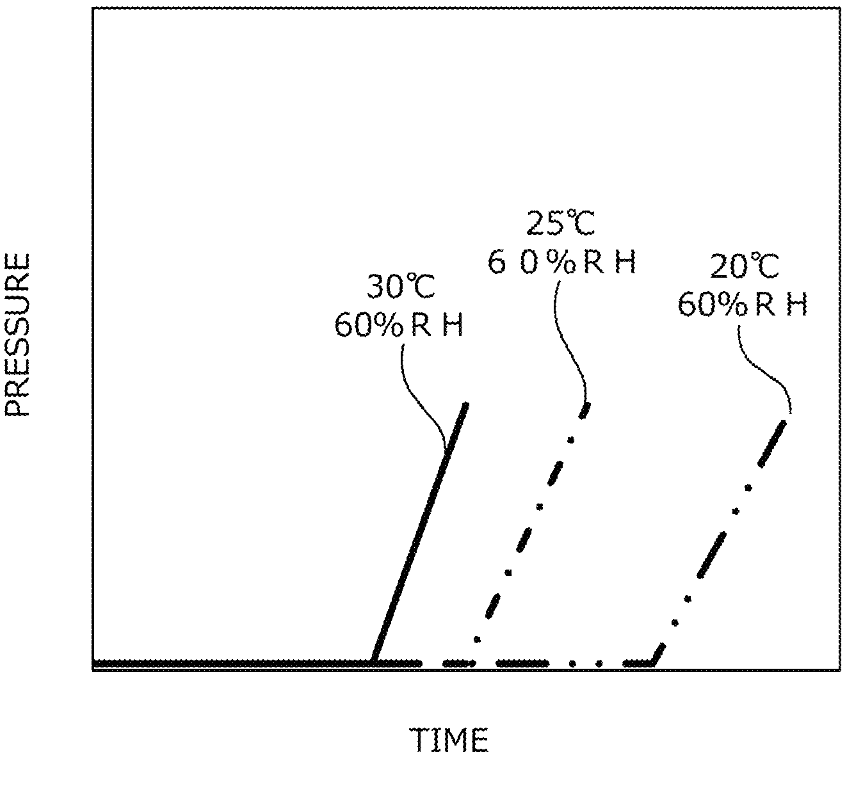
FIG. 10 is a graph showing a relation between the pressure of the vacuum heat insulating body of FIG. 3 and a time.

As shown in FIG. 10, the internal pressure of the vacuum heat insulating body 10 changes with time. In a certain period from a start time point, gas which remains in or has gotten into the vacuum heat insulating body 10 is adsorbed by the gas adsorbing member 17. Therefore, the internal pressure of the vacuum heat insulating body 10 is suppressed to low pressure, i.e., for example, 10 Pa or lower. This state continues until an adsorption amount of the gas adsorbing member 17 is saturated, and the heat insulation performance of the vacuum heat insulating body 10 is maintained high.

Then, when the adsorption amount of the gas adsorbing member 17 is saturated, the amount of gas which has gotten into the vacuum heat insulating body 10 increases with time. With this, the pressure of the vacuum heat insulating body 10 increases, and the heat insulation performance deteriorates. Therefore, the life of the vacuum heat insulating body 10 is set based on the pressure.

However, as the environmental temperature of the vacuum heat insulating body 10 increases, an increase start timing of the pressure becomes early, and an increase rate of the pressure increases. Moreover, as the environmental humidity of the vacuum heat insulating body 10 increases, the increase start timing of the pressure becomes early, and the increase rate of the pressure increases. As above, since the increase start timing of the pressure and the increase rate of the pressure change in accordance with the environment, it is difficult to uniformly determine the life of the vacuum heat insulating body 10 based only on design parameters, such as gas barrier performance of the outer covering member 14 of the vacuum heat insulating body 10 and a use amount of the gas adsorbing member 17.

Figure 11:
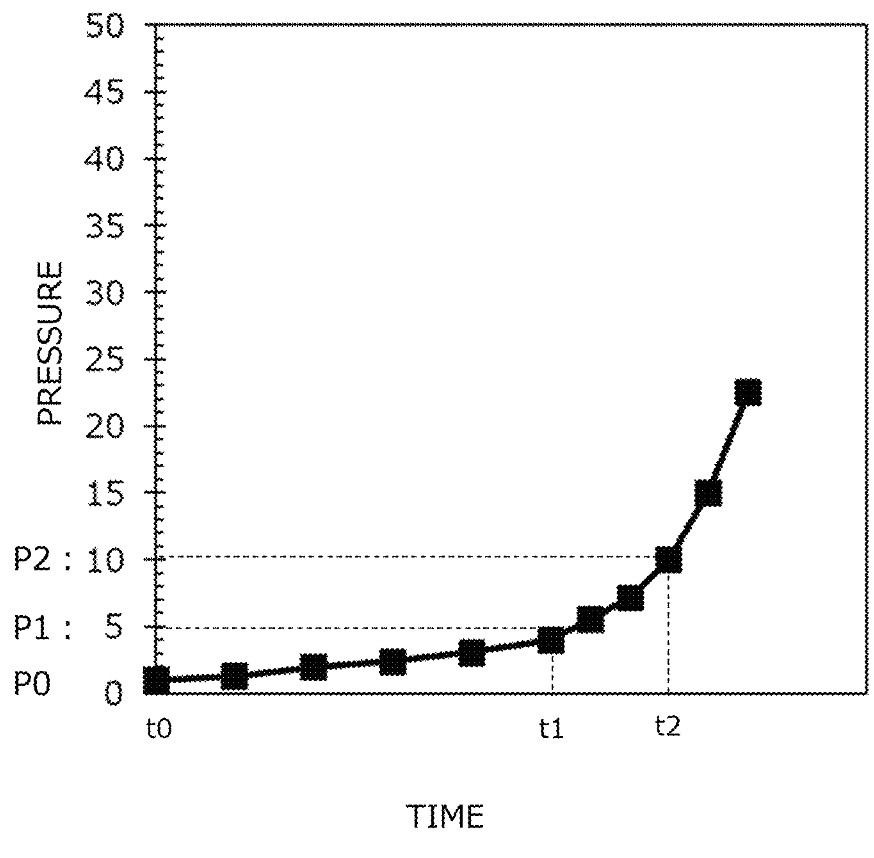
FIG. 11 is an enlarged view of a part of the graph of FIG. 10.

On the other hand, as shown in FIG. 11, in any environment, the pressure changes with time based on a predetermined correspondence relation. In FIG. 11, a vertical axis represents the pressure of the vacuum heat insulating body 10, and a horizontal axis represents an elapsed time from a start time point t0. With this, the pressure of the vacuum heat insulating body 10 changes through: a first period in which a change rate of the pressure is constant; a second period which is continuous with the first period and in which the change rate is variable; and a third period which is continuous with the second period and in which the change rate is constant.

To be specific, in a first period t0-t1 that is a period from the start time point t0 to a time point t1, the pressure of the vacuum heat insulating body 10 is suppressed to low pressure by the gas adsorbing member 17. In the first period t0-t1, the gas adsorbing member 17 maintains equilibrium pressure, and therefore, the pressure linearly increases with time at a constant rate from pressure P0 to pressure P1. The pressure P1 at the time point t1 is pressure in the vacuum heat insulating body 10 when the adsorption amount of a part of the gas adsorbing member 17 starts being saturated. The pressure P1 at the time point t1 is, for example, 5 Pa. The start time point t0 is a management start time point of the vacuum heat insulating body 10, such as a time point of the manufacture of the vacuum heat insulating body 10 or a first inspection date and time.

Next, in a second period t1-t2, a range in which the adsorption amount is saturated in the gas adsorbing member 17 increases with time, and an adsorption effect of the gas adsorbing member 17 is decreasing but is being exhibited. With this, the pressure of the vacuum heat insulating body 10 increases from the pressure P1 to pressure P2 in such a curved manner that the increase rate of the pressure increases with time. The pressure P2 at a time point t2 is pressure of the vacuum heat insulating body 10 when the adsorption amount of the entire gas adsorbing member 17 is saturated. The pressure P2 at a time point t2 represents the life of the gas adsorbing member 17 and is, for example, 10 Pa.

In a third period t2-, the adsorption amount of the entire gas adsorbing member 17 is saturated, and the adsorption effect of the gas adsorbing member 17 is not exhibited. Therefore, the pressure of the vacuum heat insulating body 10 linearly increases with time at a constant rate. The increase rate depends on the gas barrier performance (for example, gas permeability and thickness of the outer covering member 14) of the outer covering member 14 of the vacuum heat insulating body 10.

Such relation (predetermined correspondence relation) between the pressure of the vacuum heat insulating body 10 and the elapsed time as shown in FIG. 11 is obtained in advance by experiments, simulation, or the like, and is stored in the storage portion 105. Moreover, as described above, the inspection pressure and inspection date and time of the vacuum heat insulating body 10 by the inspection device 70 are associated with each other and stored in the storage portion 105.

By applying the inspection pressure and the inspection date and time to the predetermined correspondence relation shown in FIG. 11, the estimating portion 101 can estimate the life of the vacuum heat insulating body 10 with respect to the desired heat insulation performance. For example, when the pressure range (P0-P1) in which the pressure change rate is constant achieves the desired heat insulation performance based on the adsorption ability of the gas adsorbing member 17, the pressure P1 is set as predetermined pressure. In this case, the first period t0-t1 corresponding to this pressure range P0-P1 is estimated as the life.

Method of Managing Vacuum Heat Insulating Body

As a method of managing the vacuum heat insulating body 10, the following will describe a case where the transportation box 20 including the vacuum heat insulating body 10 is managed by utilizing the management system 100 for the vacuum heat insulating body 10 in FIGS. 1 and 2 by the user, the provider, and the manufacturer of the transportation box 20.

Figure 12:
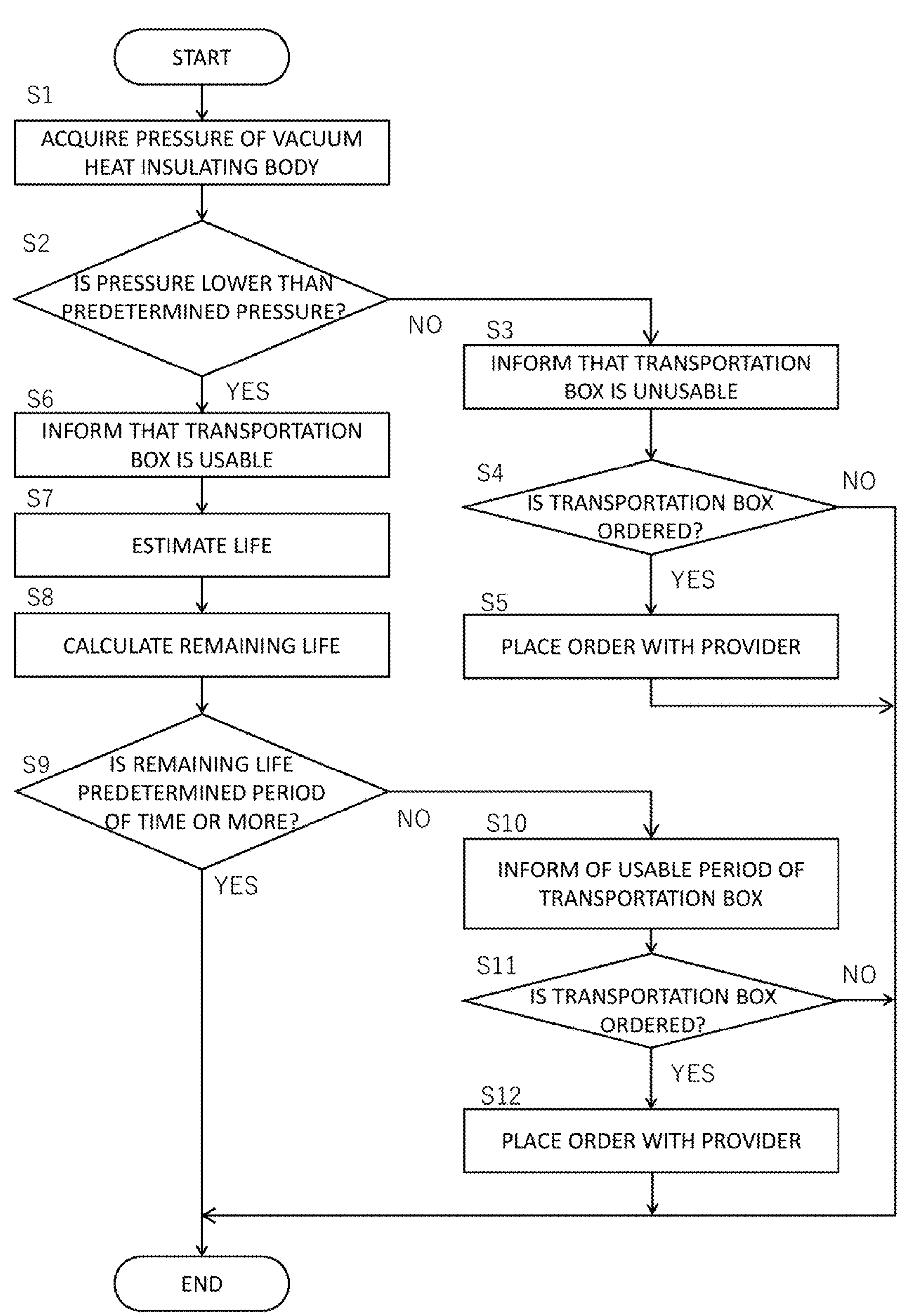
FIG. 12 is a flowchart showing one example of a management method using the management system for the vacuum heat insulating body of FIG. 1.

As shown in FIG. 12, in the method of managing the vacuum heat insulating body 10, first, the manufacturer inspects the pressure of the vacuum heat insulating body 10 of the transportation box 20 by using the inspection device 70 at the time of the manufacture of the transportation box 20. Then, the provider inspects the pressure of the vacuum heat insulating body 10 of the transportation box 20 by using the inspection device 70 when, for example, the provider delivers or ships the transportation box 20 received from the manufacturer. These inspection pressures are associated with the transmitting portion ID of the vacuum heat insulating body 10 and the receiving portion IDs and inspection dates and times of the inspection devices 70 of the manufacturer and the provider and are stored in the storage portion 105.

The receiving portion ID of the inspection device 70 of the provider may be used as the identification information of the provider. Moreover, when the identification information of the provider is set separately from the receiving portion ID of the inspection device 70 of the provider, the receiving portion ID and the identification information of the provider may be associated with each other and stored in the storage portion 105. Furthermore, as with the identification information of the provider, the identification information of the manufacturer is set.

The inspected vacuum heat insulating body 10 is provided from the provider to the user. Immediately before using the transportation box 20, the user inspects the pressure of the vacuum heat insulating body 10 of the transportation box 20 by using the inspection device 70. The inspection pressure is associated with the transmitting portion ID of the vacuum heat insulating body 10 and the receiving portion ID and inspection date and time of the inspection device 70 of the user and stored in the storage portion 105. The receiving portion ID of the inspection device 70 of the user may be used as the identification information of the user. Moreover, when the identification information of the user is set separately from the receiving portion ID of the inspection device 70 of the user, the receiving portion ID and the identification information of the user may be associated with each other and stored in the storage portion 105.

The determining portion 102 of the user acquires the inspection pressure immediately before the use (Step S1), and determines whether or not the inspection pressure is lower than predetermined pressure (Step S2). The predetermined pressure is set in advance in accordance with the heat insulation performance of the vacuum heat insulating body 10, required performance of the transportation box 20, and the like. For example, based on the time-lapse change of the pressure of the vacuum heat insulating body 10 in FIG. 11, the pressure P1 at the time point t1, i.e., 5 Pa may be set as the predetermined pressure.

When the inspection pressure of the vacuum heat insulating body 10 is the predetermined pressure or higher (No in Step S2), the determining portion 102 informs of a determination result by displaying on the display device 108 that the vacuum heat insulating body 10 cannot be used (Step S3). With this, even when unexpected damage, such as the breakage of the outer covering member 14 of the vacuum heat insulating body 10, occurs, the utilization of the transportation box 20 in which the heat insulation performance of the vacuum heat insulating body 10 is low can be avoided based on the determination result. When the pressure inspection of Step S2 is performed plural times, and the inspection pressures obtained by the pressure inspections consecutively performed a predetermined number of times are lower than the predetermined pressure, the determining portion 102 may inform that the vacuum heat insulating body 10 cannot be used.

Then, the ordering portion **103*a* displays an order receiving button on the display device 108 and receives a new order for the transportation box 20 (Step S4). The user sees the determination result, and when the user determines that another transportation box 20 is necessary, the user inputs the order by using the input device 109 (Yes in Step S4). Upon receipt of this order, the ordering portion 103*a* outputs the order for the transportation box 20 together with the identification information of the user to the provider based on the identification information of the provider (Step S5**).

The order of the user is not limited to the order for one new transportation box 20 in place of the transportation box 20 which has been determined to be unusable. When increasing the number of transportation boxes 20 stored by the user, the user may order two or more transportation boxes 20 with the provider. Moreover, the provider who has received the order may request (order) the manufacture of the transportation box 20 to the manufacturer by the ordering portion **103*b* in accordance with the number of transportation boxes 20** owned by the provider.

The order receiving portion 104 of the provider receives the order from the ordering portion **103*a* of the user and the identification information of the user. The provider prepares the transportation box 20 in accordance with the order and performs the pressure inspection of the vacuum heat insulating body 10 by the inspection device 70. Then, the provider provides to the user the transportation box 20 including the vacuum heat insulating body 10 having pressure lower than the predetermined pressure. With this, the user can possess and continuously use a predetermined number of transportation boxes 20** that satisfy the predetermined heat insulation performance.

In contrast, when the determining portion 102 of the user determines in Step S2 that the inspection pressure of the vacuum heat insulating body 10 is lower than the predetermined pressure (Yes in Step S2), the determining portion 102 of the user determines that the transportation box 20 is usable, and informs of this by displaying (Step S6). Then, the estimating portion 101 estimates the life of the vacuum heat insulating body 10 based on the information of the storage portion 105 (Step S7).

To be specific, the storage portion 105 of the management system 100 is a cloud server that can be accessed by the user and the provider. Therefore, the storage portion 105 stores the inspection result of the vacuum heat insulating body 10 by the user together with the inspection result of the vacuum heat insulating body 10 by the provider. In the inspection result, the transmitting portion ID of the vacuum heat insulating body 10 is used as the identification information of the vacuum heat insulating body 10, and the inspection pressure and inspection date and time of the vacuum heat insulating body 10 are associated with the transmitting portion ID and are stored.

Figure 13:
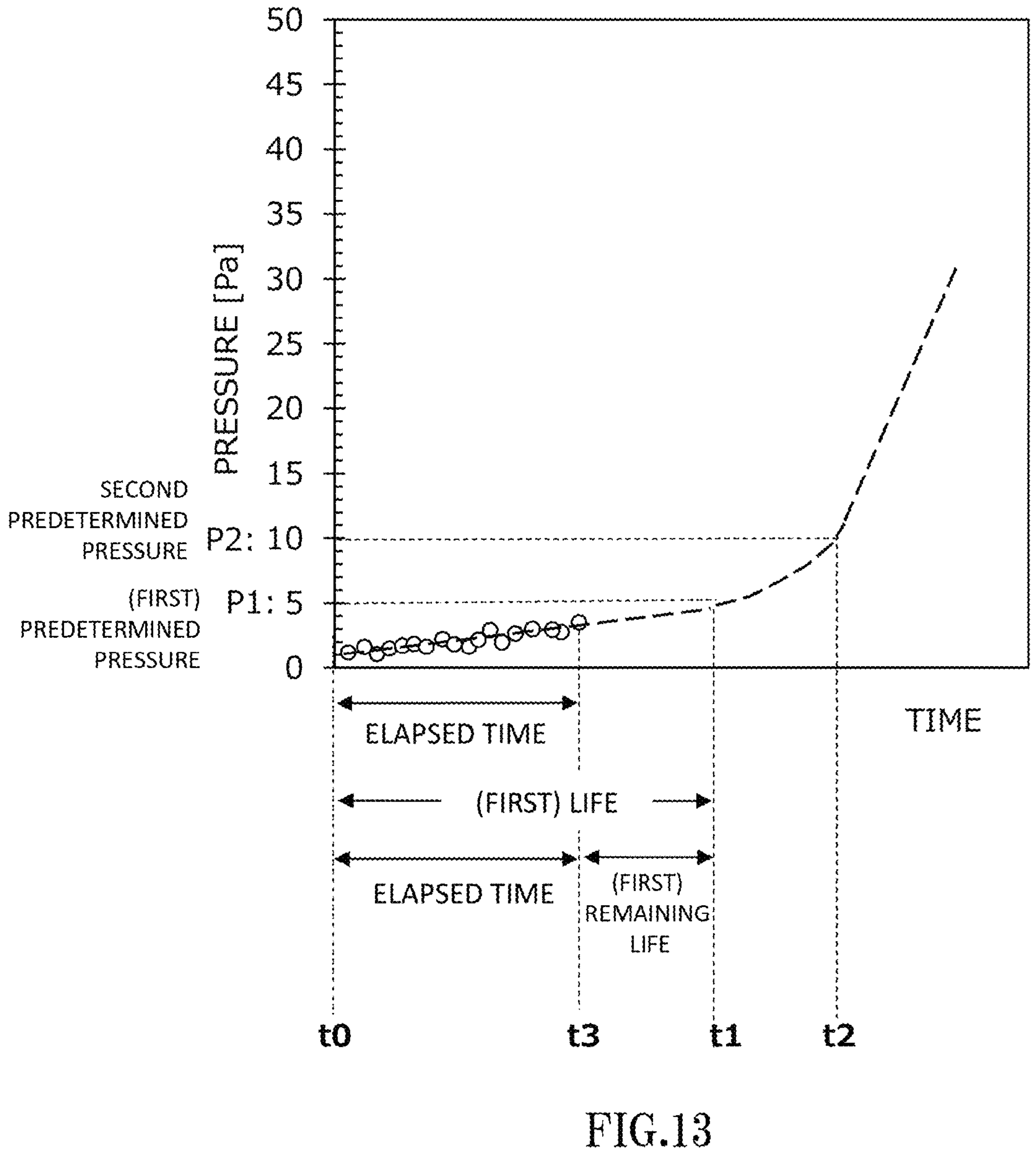
FIG. 13 is a graph showing a relation between inspection pressure (pressure) of the vacuum heat insulating body of FIG. 3 and an inspection date and time (time).

Based on the inspection pressures and inspection dates and times of the identification information of the vacuum heat insulating body 10, as shown by white circles in FIG. 13, the pressures and the time points are associated with each other for one vacuum heat insulating body 10. For example, when a utilization ratio of the transportation boxes 20 by the user is 20% to 30%, each transportation box 20 is used once three or four days. Each time the transportation box 20 is used, the vacuum heat insulating body 10 of the transportation box 20 is inspected, and the inspection result is accumulated in the storage portion 105.

The estimating portion 101 applies the predetermined correspondence relation, shown by a broken line, to the inspection pressures and the inspection dates and times. Then, as the life of the vacuum heat insulating body 10, the estimating portion 101 estimates the first period t0-t1 that is a period to the time point t1 corresponding to the predetermined pressure P1 in the applied correspondence relation. The life of the vacuum heat insulating body 10 is four or five years when the vacuum heat insulating body 10 is stored at a temperature of 25° C. and a humidity of 60%.

As the remaining life, the estimating portion 101 calculates a difference t1-t3 between the life t0-t1 and an elapsed time t0-t3 from the start time point t0 to an inspection date and time t3 of this time (Step S8). The determining portion 102 determines whether or not the remaining life t1-t3 is a predetermined period of time or more (Step S9). The predetermined period of time is a period of time necessary for the user to obtain another transportation box 20 having the predetermined heat insulation performance from the provider. The predetermined period of time is, for example, six months.

When the remaining life is less than the predetermined period of time (No in Step S9), the determining portion 102 determines the remaining life as a usable period t3-t1 of the vacuum heat insulating body 10 and informs of the usable period by displaying the usable period on the display device 108 (Step S10). With this, the user can replace or replenish the transportation box 20 at an appropriate timing and can continuously use the transportation boxes 20 that satisfy the predetermined heat insulation performance.

Then, the ordering portion 103*a* displays the order receiving button on the display device 108 and receives a new order for the transportation box 20 (Step S11). Herein, when the user inputs the order for the transportation box 20 (Yes in Step S11), an order request is output from the ordering portion 103*a* to the provider (Step S12). The order receiving portion 104 of the provider receives the order from the ordering portion 103*a* and the identification information of the user. The provider performs the pressure inspection of the transportation box 20 by the inspection device 70 in accordance with the order and provides to the user the transportation box 20 including the vacuum heat insulating body 10 that satisfies the predetermined heat insulation performance.

In contrast, in Step S9, when the remaining life of the vacuum heat insulating body 10 is the predetermined period of time or more (Yes in Step S9), the remaining life of the vacuum heat insulating body 10 is adequate for its use. Therefore, the user can use the transportation box 20 that satisfies the predetermined heat insulation performance. Even when the remaining life is the predetermined period of time or more, the determining portion 102 may inform of the usable period t3-t1 of the transportation box 20. With this, the user can easily and appropriately manage the transportation box 20.

As above, the user uses the transportation box 20 that has been determined to be usable by the inspection, and packs the article M together with a heat accumulating member 94, a temperature logger, and the like in the transportation box 20 and sends it out. With this, the transportation box 20 is transported to a delivery destination, such as a medical institution, in a state where an internal temperature of the transportation box 20 is being managed. When the article M is delivered to the delivery destination, the transportation box 20 is returned from the delivery destination to the user and stored.

In the management system 100, the identification information of the user and the identification information of the vacuum heat insulating body 10 are associated with each other and stored in the storage portion 105. By displaying these on the display device 108, the user can manage the number of transportation boxes 20 possessed by the user.

Moreover, in the management system 100, the identification information of the vacuum heat insulating body 10 and the identification information (for example, the receiving portion ID) of the inspection device 70 which has inspected the vacuum heat insulating body 10 are associated with each other and stored in the storage portion 105. With this, the provider can manage a location of the vacuum heat insulating body 10.

Furthermore, when sending the transportation box 20 to the delivery destination, the user may associate a use flag with the identification information of the vacuum heat insulating body 10 and store them in the storage portion 105. Then, when the transportation box 20 is returned from the delivery destination, the user may delete the use flag from the storage portion 105. In this case, the user can calculate the number of transportation boxes 20 in stock by subtracting the number of transportation boxes 20 that are in use and provided with the use flags from the number of transportation boxes 20 possessed by the user based on the identification information of the vacuum heat insulating bodies 10. With this, the number of transportation boxes 20 in use and the number of transportation boxes 20 in stock can be managed.

Moreover, the identification information of the user, the result of the determination by the user regarding whether or not the vacuum heat insulating body 10 is usable, the usable period, and the like may be displayed on the display device 108 of the provider. With this, the provider can easily make a plan of the manufacture of the transportation box 20 for the user.

Embodiment 2

Configuration of Management System for Vacuum Heat Insulating Body

Figure 14:
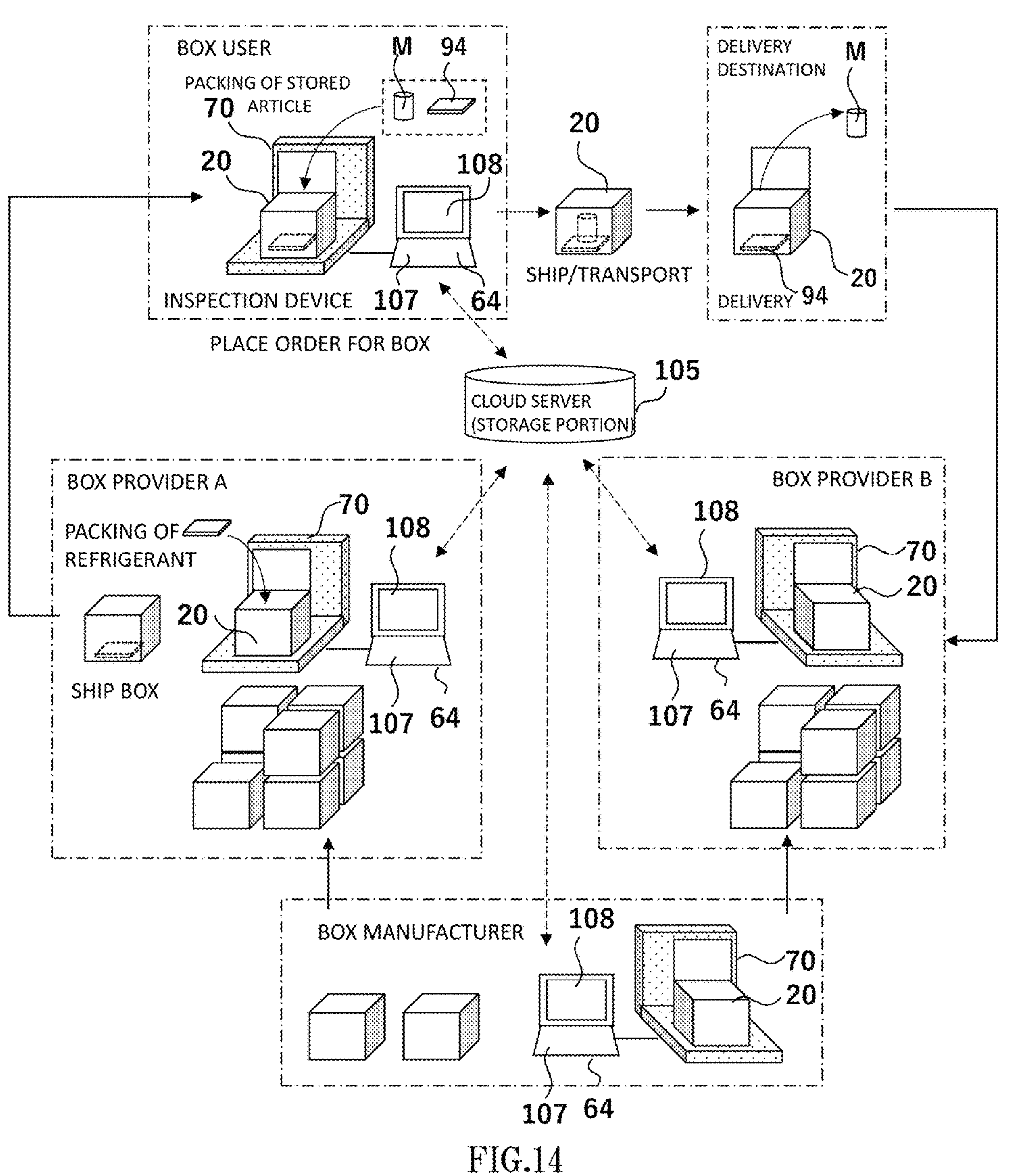
FIG. 14 is a diagram showing the management system for the vacuum heat insulating body according to Embodiment 2 of the present invention.

The following will described a case where in the method of managing the vacuum heat insulating body 10 according to Embodiment 2, the user, the provider, and the manufacturer of the transportation box 20 utilize the management system 100 for the vacuum heat insulating body 10 in FIG. 14 to manage the transportation box 20 including the vacuum heat insulating body 10.

In FIG. 1, the user possesses a predetermined number of transportation boxes 20, and the provider provides to the user the transportation boxes 20 for replacement or replenishment. However, in FIG. 14, the provider possesses a predetermined number of transportation boxes 20 and provides to the user the transportation box 20 when the user needs the transportation box 20. Moreover, in FIG. 1, the transportation box 20 is returned from the delivery destination to the user. However, in FIG. 14, the transportation box 20 is returned from the delivery destination to the provider. Furthermore, in FIG. 14, the transportation box 20 is returned to a provider B, but the transportation box 20 may be returned to a provider A. In FIG. 14, the ordering portion 103*b* of the provider places the order for the vacuum heat insulating body 10 based on the determination result of the determining portion 102.

Figure 15:
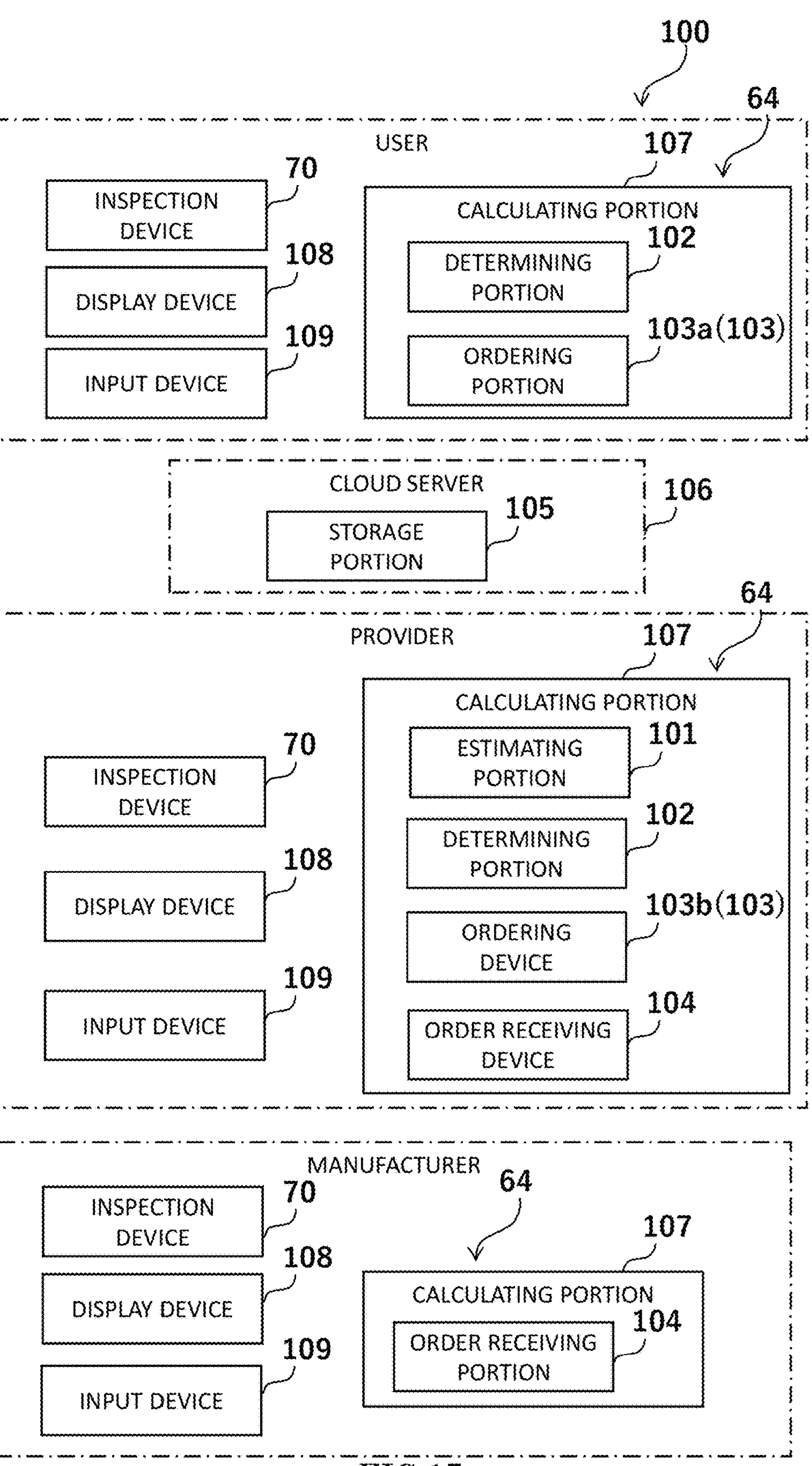
FIG. 15 is a functional block diagram showing the configuration of the management system for the vacuum heat insulating body of FIG. 14.

Moreover, as shown in FIG. 15, the user includes the inspection device 70, the determining portion 102, the ordering portion 103*a*, the display device 108, and the input device 109. The provider includes the inspection device 70, the estimating portion 101, the determining portion 102, the ordering portion 103*b*, the order receiving portion 104, the display device 108, and the input device 109. The manufacturer includes the inspection device 70, the order receiving portion 104, the display device 108, and the input device 109. The user, the provider, and the manufacturer utilize the cloud server together as the storage portion 105 of the management system 100 and share the information of the vacuum heat insulating body 10.

Method of Managing Vacuum Heat Insulating Body

Figure 16:
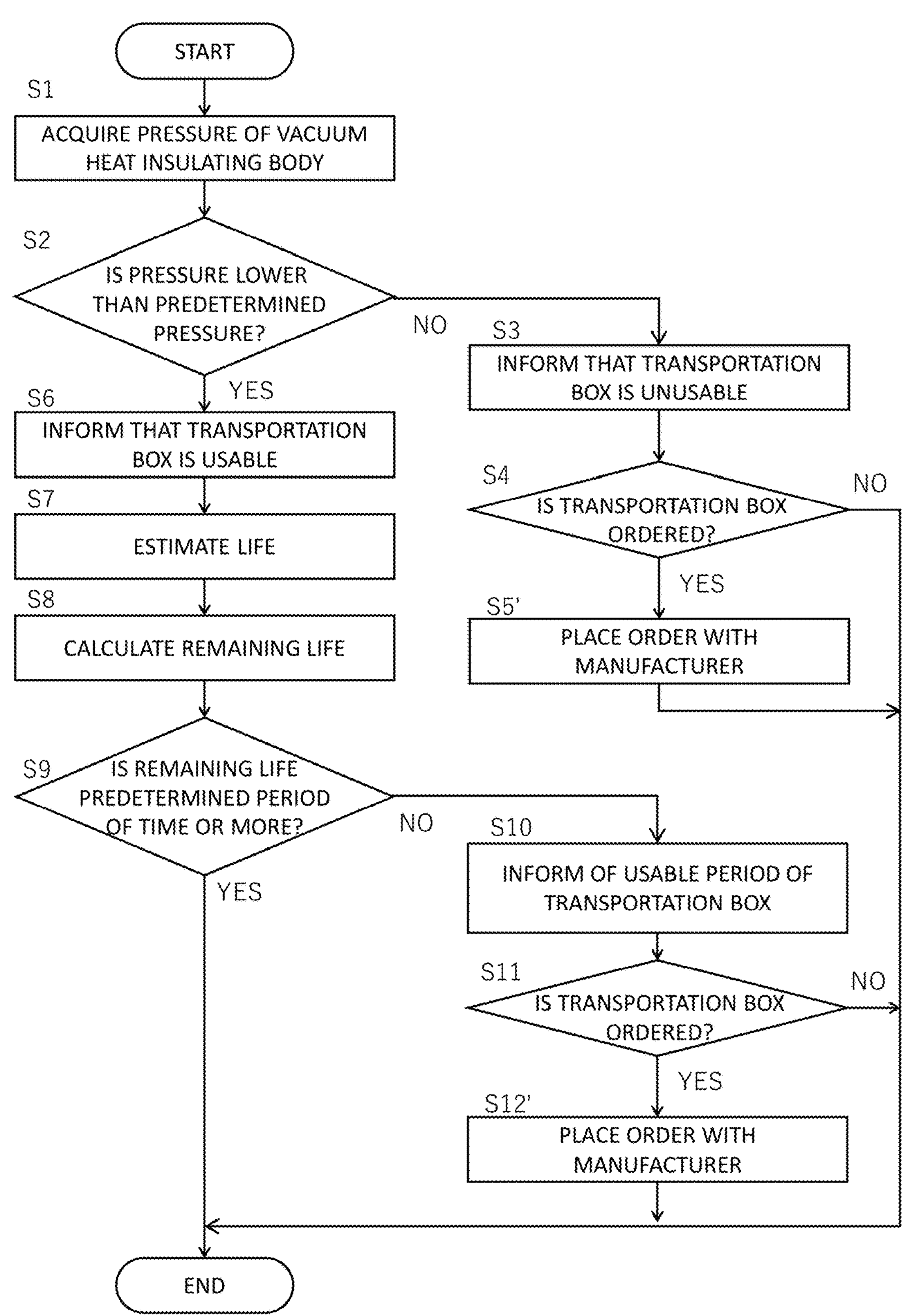
FIG. 16 is a flowchart showing one example of the management method performed by a provider using the management system for the vacuum heat insulating body of FIG. 14.

The method of managing the vacuum heat insulating body 10 by the provider is performed based on, for example, a flowchart shown in FIG. 16. In the flowchart of FIG. 16, Steps S5' and S12' are executed instead of Steps S5 and S12 of the flowchart of FIG. 12.

Specifically, immediately before providing the transportation box 20, the provider inspects the pressure of the vacuum heat insulating body 10 by the inspection device 70. The determining portion 102 acquires the inspection pressure (Step S1) and determines whether or not the inspection pressure is lower than the predetermined pressure (Step S2). When the inspection pressure is the predetermined pressure or higher (No in Step S2), the determining portion 102 informs that the vacuum heat insulating body 10 is unusable (Step S3) and terminates the management of the vacuum heat insulating body 10. With this, it is possible to avoid a case where the transportation box 20 including the vacuum heat insulating body 10 whose heat insulation performance has been deteriorated by unexpected damage is provided to the user, and the user utilizes it.

Then, the ordering portion 103*b* of the provider displays the order receiving button on the display device 108 and receives a new order for the transportation box 20 (Step S4). The provider sees the determination result, and when the provider determines that another transportation box 20 is necessary, the provider inputs the order by using the input device 109 (Yes in Step S4). Upon receipt of the order, the ordering portion 103*b* outputs the order for the transportation box 20 together with the identification information of the provider to the manufacturer based on the identification information of the manufacturer (Step S5').

In contrast, in Step S2, when the inspection pressure of the vacuum heat insulating body 10 is lower than the predetermined pressure (Yes in Step S2), the determining portion 102 informs that the transportation box 20 is usable (Step S6). The transportation box 20 including the vacuum heat insulating body 10 that satisfies the predetermined heat insulation performance can be provided to the user.

Then, the estimating portion 101 estimates the life of the vacuum heat insulating body 10 based on the inspection pressure and the inspection date and time stored in the storage portion 105 (Step S7) and calculates the remaining life based on the life of the vacuum heat insulating body 10 (Step S8). The determining portion 102 determines whether or not the remaining life is the predetermined period of time or more (Step S9). When the remaining life is less than the predetermined period of time (No in Step S9), the determining portion 102 informs the provider of the usable period of the vacuum heat insulating body 10 (Step S10). With this, the provider can provide the transportation box 20 to the user and make a plan regarding the replacement or replenishment of the transportation box 20 based on the usable period.

Therefore, the ordering portion 103*b* of the provider displays the order receiving button on the display device 108 and receives a new order for the transportation box 20 (Step S11). The provider sees the determination result, and when the provider determines that another transportation box 20 is necessary, the provider inputs the order by using the input device 109 (Yes in Step S11). Upon receipt of the order, the ordering portion 103*b* outputs the order for the transportation box 20 together with the identification information of the provider to the manufacturer based on the identification information of the manufacturer (Step S12').

In Step S9, when the remaining life of the vacuum heat insulating body 10 is the predetermined period of time or more (Yes in Step S9), the provider provides the transportation box 20 to the user. Herein, the determining portion 102 may inform the provider of at least one of the remaining life or the usable period of the transportation box 20.

Figure 17:
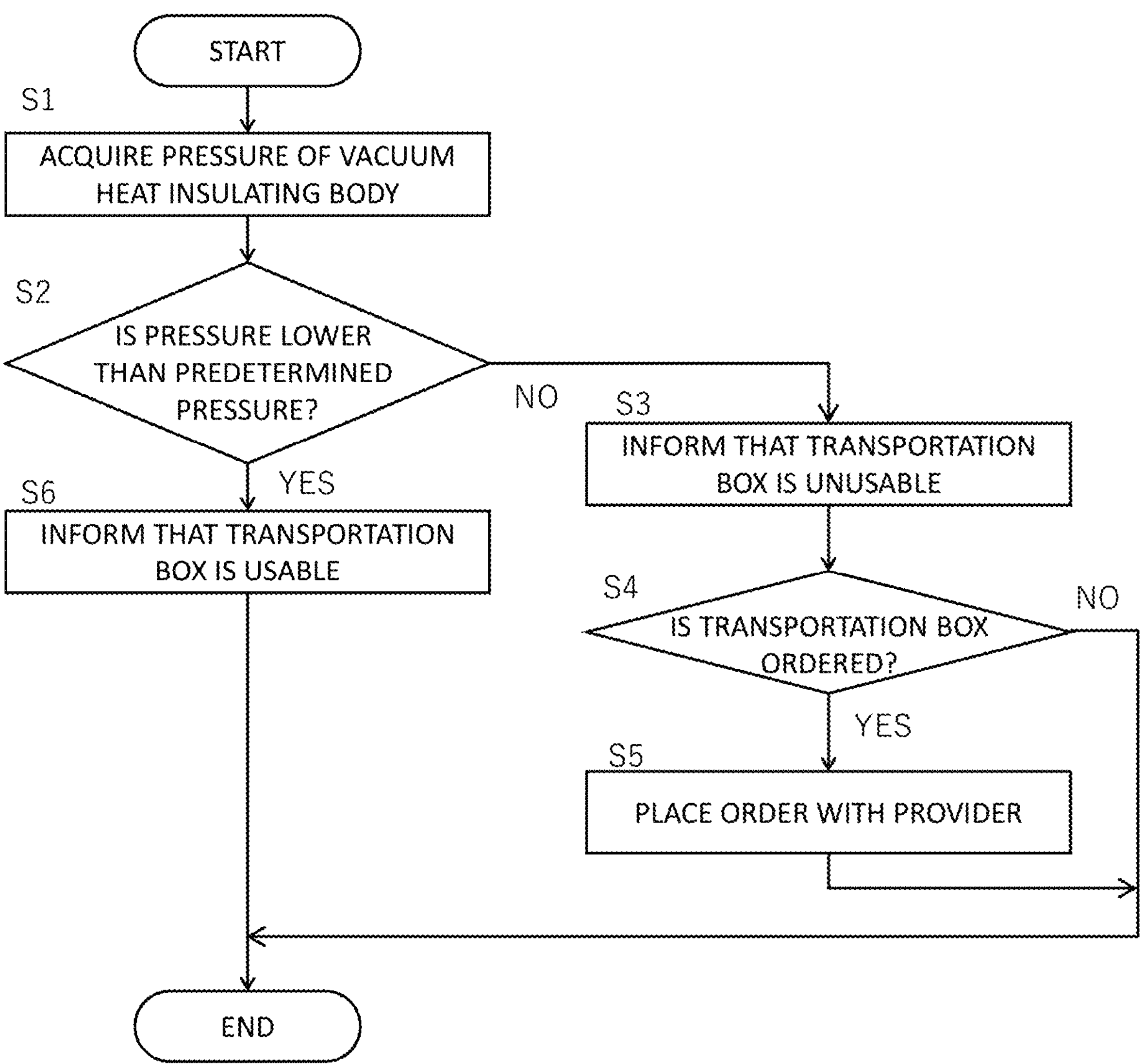
FIG. 17 is a flowchart showing one example of the management method performed by a user using the management system for the vacuum heat insulating body of FIG. 14.

Moreover, the method of managing the vacuum heat insulating body 10 by the user is performed based on, for example, a flowchart shown in FIG. 17. In the flowchart of FIG. 17, Steps S1 to S6 of the flowchart of FIG. 12 are executed, and Steps S7 to S12 are omitted.

Specifically, immediately before using the transportation box 20, the user inspects the pressure of the vacuum heat insulating body 10 by the inspection device 70. The determining portion 102 acquires the inspection pressure (Step S1) and determines whether or not the inspection pressure is lower than the predetermined pressure (Step S2). When the inspection pressure is the predetermined pressure or higher (No in Step S2), the determining portion 102 informs that the vacuum heat insulating body 10 is unusable (Step S3). With this, the utilization of the transportation box 20 including the vacuum heat insulating body 10 whose heat insulation performance has been deteriorated by unexpected damage can be avoided.

Then, when the user places the order for the transportation box 20 based on the above informing that the vacuum heat insulating body 10 is unusable (Yes in Step S4), the ordering portion 103*a* outputs the order for the transportation box 20 together with the identification information of the user to the provider (Step S5). Upon receipt of the order, the order receiving portion 104 of the provider provides to the user the transportation box 20 having pressure lower than the predetermined pressure. With this, the transportation box 20 including the vacuum heat insulating body 10 that satisfies the predetermined heat insulation performance can be used.

In contrast, in Step S2, when the inspection pressure of the vacuum heat insulating body 10 is lower than the predetermined pressure (Yes in Step S2), the determining portion 102 informs that the transportation box 20 is usable (Step S6). With this, the user can use the transportation box 20 including the vacuum heat insulating body 10 that satisfies the predetermined heat insulation performance.

Then, the user packs the article M together with the heat accumulating member 94, the temperature logger, and the like in the transportation box 20 that has been determined to be usable, and sends it out. With this, the transportation box 20 is transported to a delivery destination, such as a medical institution, in a state where the internal temperature of the transportation box 20 is being managed. When the article M is delivered to the delivery destination, the transportation box 20 is returned to the provider and stored.

For example, an investigational drug may be transported internationally, and the failure of the temperature management of the investigational drug causes great loss. In this case, the deterioration of the heat insulation performance of the vacuum heat insulating body 10 by breakage or aging degradation is concerned. Moreover, it is difficult to, for example, visually determine the heat insulation performance based on appearance. Therefore, the use of the transportation box 20 including the vacuum heat insulating body 10 is avoided, and expensive constant temperature aircraft containers and refrigerator vehicles have been used. However, since the heat insulation performance of the transportation box 20 can be managed by the management system 100 for the transportation box 20, the transportation box 20 can be utilized for the international transportation of the investigational drug and the like. With this, the cost for the transportation can be reduced.

In addition to the transportation box 20, the provider may store options, such as the heat accumulating member 94 and the temperature logger. In this case, the provider may provide the options when providing the transportation box 20 to the user. With this, the user can easily transport the article M by using these.

Moreover, the provider may include providing places. For example, when the delivery destination and the providing place are located overseas, the delivery destination may return the transportation box 20 to the providing place located overseas. Even in this case, since the management system 100 for the vacuum heat insulating body 10 is located at the providing place, the provider can manage the vacuum heat insulating body 10.

Modified Example 1

In the management system 100 for the vacuum heat insulating body 10 according to each of the embodiments and the modified example, the predetermined pressure is set to the pressure P1 based on a first range P0-P1 in which the rate of the time-lapse change of the heat insulation performance of the vacuum heat insulating body 10 in FIG. 11 is constant. However, the predetermined pressure is not limited to this. For example, the predetermined pressure may be set to the pressure P2 based on a total range P0-P2 including the first range P0-P1 and a second range P1-P2 in which the rate of the time-lapse change changes after the first range P0-P1.

In this case, the life is a total period t0-t2 which corresponds to the total range P0-P2 and includes the first period and the second period. In the total period t0-t2, the gas adsorbing member 17 can achieve its adsorption effect. Therefore, the vacuum heat insulating body 10 can obtain the excellent heat insulation performance. With this, the user can use the transportation box 20 having the appropriate heat insulation performance corresponding to the article M.

Modified Example 2

In the management system 100 for the vacuum heat insulating body 10 according to each of the embodiments and the modified examples, the predetermined pressure is set to one. However, the number of predetermined pressures is not limited to this and may be plural. For example, as shown in FIG. 13, the predetermined pressures may include a first predetermined pressure P1 (for example, P1 is 5 Pa) and a second predetermined pressure P2 (for example, P2 is 10 Pa) that is higher than the first predetermined pressure P1.

As described above, the first period t0-t1 corresponding to the first range P0-P1 in which the pressure changes linearly is estimated as a first life. Even when the life is estimated as above, at the time point t1 at which the transportation box whose use frequency is rarely low and inspection span is long is inspected, the inspection pressure of such transportation box exceeds the first predetermined pressure P1 in some cases. In this case, the pressure that secures the heat insulation performance necessary for the vacuum heat insulating body 10 is set to the second predetermined pressure P2. With this, when the inspection pressure is the second predetermined pressure P2 or lower, using the vacuum heat insulating body 10 only once is allowed, and it is informed that the vacuum heat insulating body 10 is usable this time only.

Figure 18:
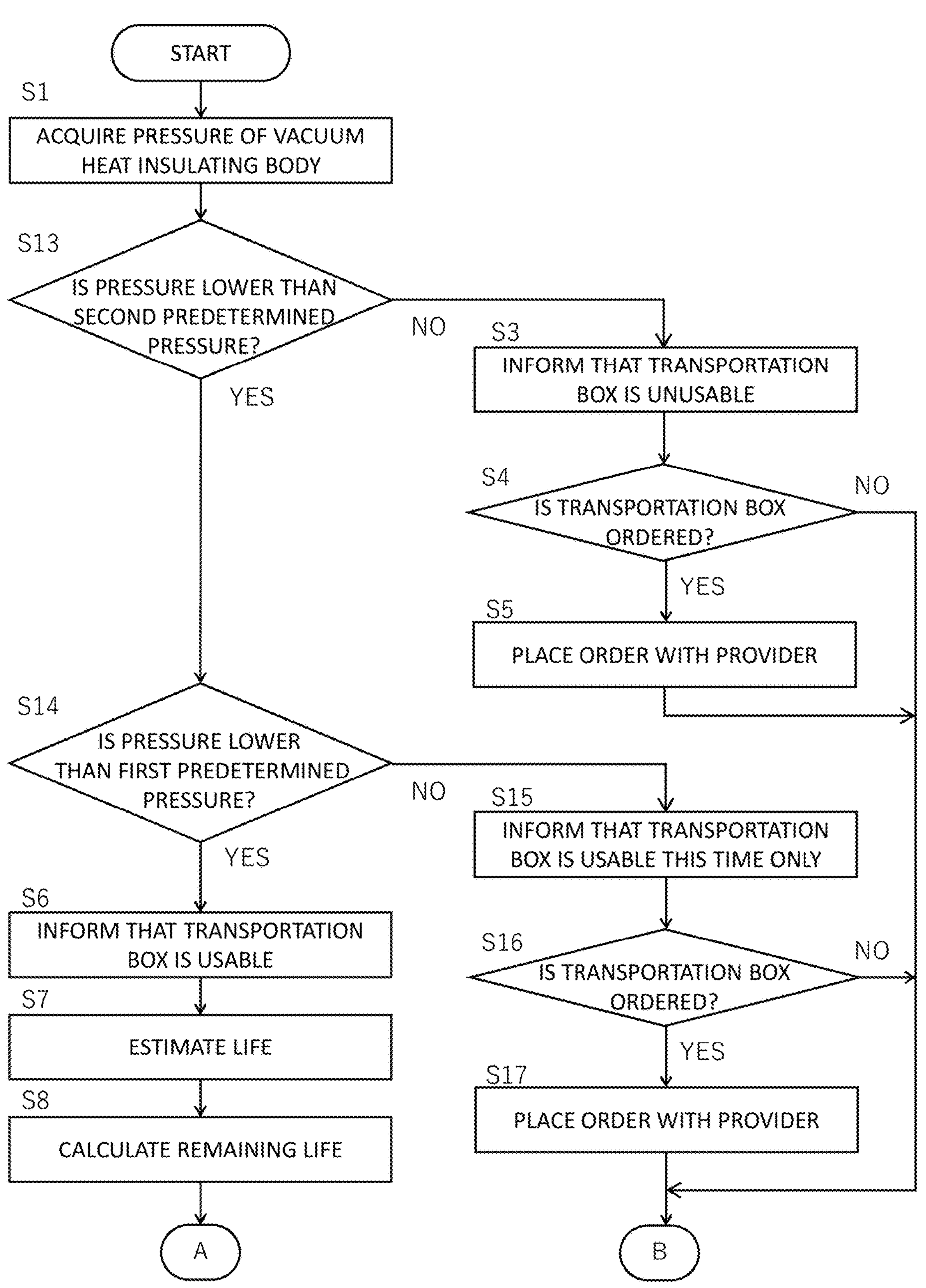
FIG. 18 is a part of a flowchart showing one example of the management method using the management system for the vacuum heat insulating body according to Modified Example 2 of the present invention.
Figure 19:
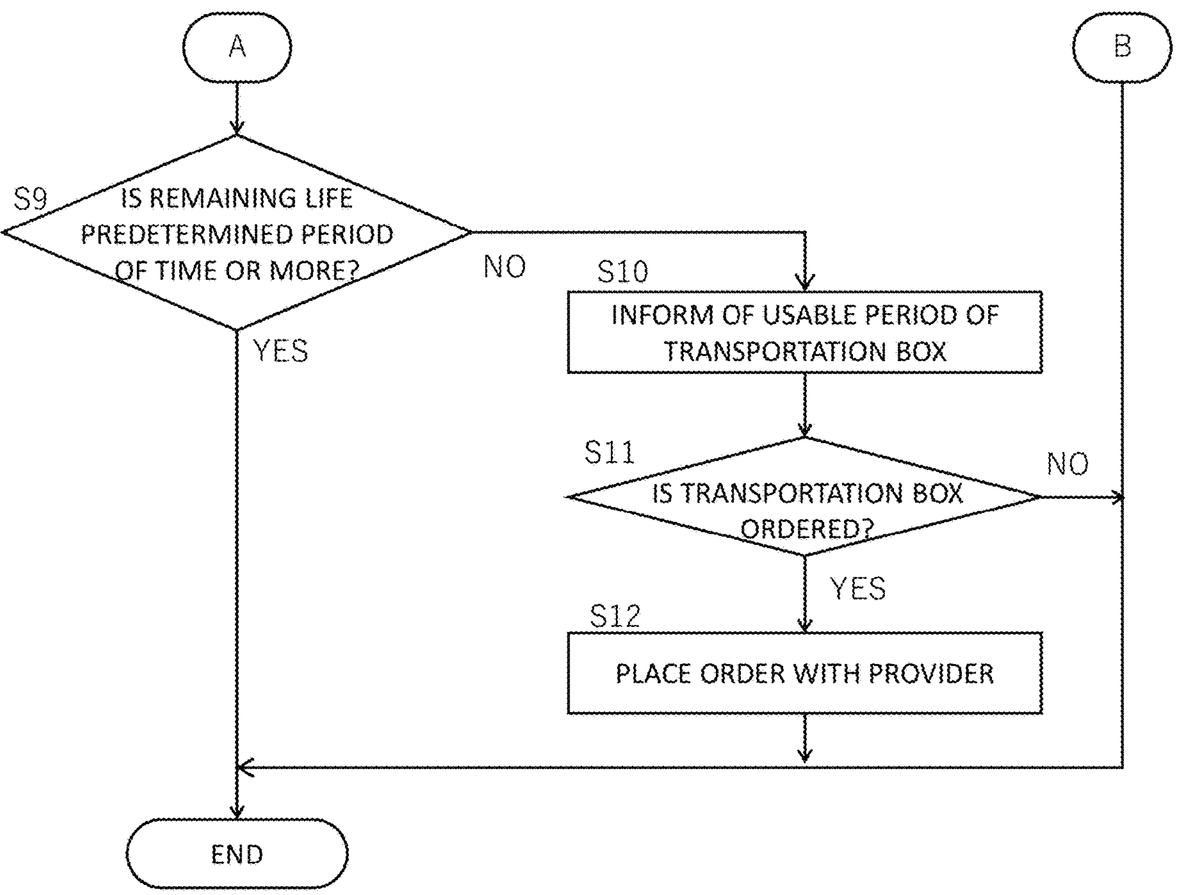
FIG. 19 is a remaining part of the flowchart of FIG. 18.

For example, the method of managing the vacuum heat insulating body 10 is executed based on the flowcharts shown in FIGS. 18 and 19. In the flowcharts of FIGS. 18 and 19, Step S13 is executed instead of Step S2 of FIG. 12, and Steps S14 to S17 are executed between Steps S13 and S6. The following will describe the execution of the steps by the user. On the other hand, when the provider executes the steps, the provider places the order for the transportation box 20 with the manufacturer in Steps S5, S17, and S12.

Specifically, the determining portion 102 acquires the inspection pressure of the vacuum heat insulating body 10 (Step S1) and determines whether or not the inspection pressure is lower than the second predetermined pressure (Step S13). When the inspection pressure of the vacuum heat insulating body 10 is the second predetermined pressure or higher (No in Step S13), the determining portion 102 determines and informs that the transportation box is unusable (Step S3). Then, when the transportation box 20 is ordered (Yes in Step S4), the ordering portion 103*a* outputs the order for the transportation box 20 to the provider (Step S5).

In Step S13, when the inspection pressure of the vacuum heat insulating body 10 is lower than the second predetermined pressure (Yes in Step S13), the determining portion 102 determines whether or not the inspection pressure is lower than the first predetermined pressure (Step S14). Herein, when the inspection pressure is the first predetermined pressure or higher (No in Step S14), the vacuum heat insulating body 10 has the necessary heat insulation performance. Therefore, the determining portion 102 determines and informs that the transportation box 20 is usable this time but is unusable next time (Step S15). Then, when the transportation box 20 is ordered (Yes in Step S16), the ordering portion 103*a* outputs the order for the transportation box 20 to the provider (Step S17).

In contrast, in Step S14, when the inspection pressure of the vacuum heat insulating body 10 is lower than the first predetermined pressure (Yes in Step S14), the determining portion 102 determines and informs that the transportation box 20 is usable (Step S6). Then, Steps S7 to S12 are executed.

According to this configuration, regarding the transportation box 20 whose use frequency is low and inspection span is long and whose pressure exceeds the first predetermined pressure P1 at the time of the inspection, when the inspection pressure is the second predetermined pressure P2 or lower, the determining portion 102 informs that the transportation box 20 is usable this time only, and allows the use of the transportation box 20 only once. With this, the vacuum heat insulating body 10 that satisfies the necessary heat insulation performance can be continuously used.

Modified Example 3

Figure 20:
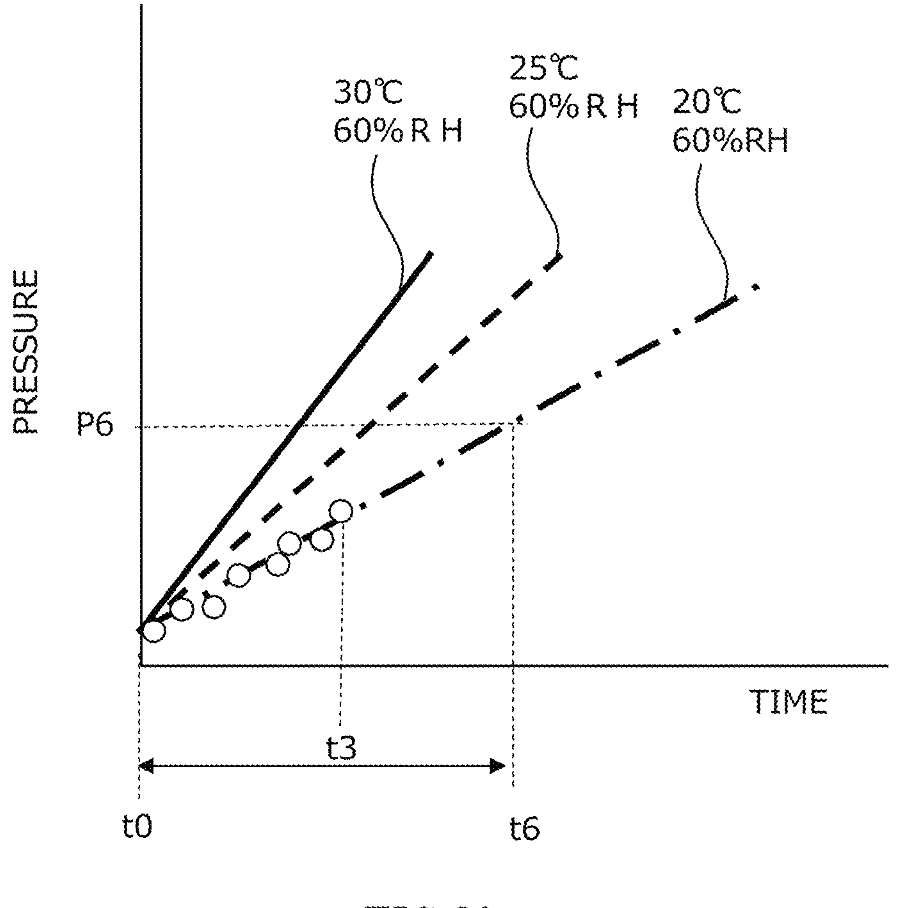
FIG. 20 is a graph showing a relation between the inspection pressure (pressure) of the vacuum heat insulating body and the inspection date and time (time) in the management system for the vacuum heat insulating body according to Modified Example 3 of the present invention.

The management system 100 for the vacuum heat insulating body 10 according to each of the embodiments and the modified examples manages the vacuum heat insulating body 10 including the gas adsorbing member 17. The management system 100 for the vacuum heat insulating body 10 may manage the vacuum heat insulating body 10 that does not include the gas adsorbing member 17. In this case, as shown in FIG. 20, the pressure of the vacuum heat insulating body 10 linearly increases with time.

The estimating portion 101 sets the necessary heat insulation performance of the vacuum heat insulating body 10 to predetermined pressure P6 (for example, 10 Pa). Then, the estimating portion 101 applies an approximate straight line to a relation between the inspection pressure and the time stored in the storage portion 105 and estimates a time t6 corresponding to the predetermined pressure P6 as a life t0-t6. The estimating portion 101 estimates a remaining life t3-t6 by subtracting the elapsed time t0-t3 from the life t0-t6. Then, the determining portion 102 determines whether or not the remaining life t3-t6 is a predetermined period of time or more. With this, the vacuum heat insulating body 10 that satisfies the necessary heat insulation performance can be continuously used.

Modified Example 4

In each of the embodiments and the modified examples, the transmitting portion 52 transmits the inspection pressure through the NFC. However, the transmitting method is not limited to this, and another near field communication may be used. For example, the transmitting portion 52 may transmit the inspection pressure through BLE (Bluetooth (trademark) low energy) communication. This uses, for example, radio waves on the 2.4 GHz frequency band. By using the BLE communication as the communication between the transmitting portion 52 and the receiving portion 71 as above, the receiving portion 71 can receive the inspection pressure from the transmitting portion 52 located away from the receiving portion 71. Therefore, the position of the receiving portion 71 is not limited to a position corresponding to the transmitting portion 52, and the degree of freedom of the arrangement position of the receiving portion 71 improves.

The communication method used by the transmitting portion 52 of the first vacuum heat insulating body 10*a* and the communication method used by the transmitting portion 52 of the second vacuum heat insulating body 10*b* may be the same as each other or may be different from each other. For example, one of the transmitting portion 52 of the first vacuum heat insulating body 10*a* and the transmitting portion 52 of the second vacuum heat insulating body 10*b* may use the NFC, and the other may use the BLE communication.

Modified Example 5

In each of the embodiments and the modified examples, the electric power receiving coil 55 of the electric power supply portion 53 receives electric power by the magnetic resonance method. However, each of the embodiments and the modified examples is not limited to this. Another wireless electric power supply method may be used. For example, the electric power receiving coil 55 may receive electric power by an electromagnetic induction method. In this case, the electric power transmitting coil 73 and the electric power receiving coil 55 are located close to each other, and an alternating current is made to flow through the electric power transmitting coil 73. With this, magnetic flux is generated, and induced electromotive force is generated at the electric power receiving coil 55 by the flux change. The electric power supply portion 53 that uses the electromagnetic induction method can be reduced in size. Therefore, while suppressing the increase in size of the vacuum heat insulating body 10, the deterioration of the heat insulation performance of the vacuum heat insulating body 10 by the electric power supply portion 53 can be suppressed.

The wireless electric power supply method used by the electric power supply portion 53 of the first vacuum heat insulating body 10*a* and the wireless electric power supply method used by the electric power supply portion 53 of the second vacuum heat insulating body 10*b* may be the same as each other or may be different from each other. For example, one of the electric power supply portion 53 of the first vacuum heat insulating body 10*a* and the electric power supply portion 53 of the second vacuum heat insulating body 10*b* may use the magnetic resonance method, and the other may use the electromagnetic induction method.

Modified Example 6

In each of the embodiments and the modified examples, the electric power supply portion 53 uses the wireless electric power supply method, but the electric power supply method is not limited to this. For example, the electric power supply portion 53 may include a battery that stores electric power to be supplied to the pressure sensor 51 and the transmitting portion 52. The electric power supply portion 53 including the battery can be reduced in size. Therefore, while suppressing the increase in size of the vacuum heat insulating body 10, the deterioration of the heat insulation performance of the vacuum heat insulating body 10 by the electric power supply portion 53 can be suppressed.

Moreover, the battery of the electric power supply portion 53 is a battery that does not use liquid electrolyte. For example, an all solid state battery, such as an all solid state lithium ion battery, is used. In this case, even when the inside of the outer covering member 14 is reduced in pressure, the liquid leakage of the battery does not occur. Therefore, the deterioration of the degree of vacuum of the vacuum heat insulating body 10 by the liquid leakage can be suppressed, and a case where electric power supply cannot be performed by the liquid leakage can be suppressed.

The inspection device 70 for the vacuum heat insulating body 10 including the battery includes the receiving portion 71 that receives the inspection pressure transmitted from the transmitting portion 52 but does not include the electric power transmitting portion 72 that transmits electric power to the electric power supply portion 53. With this, the size and cost of the inspection device 70 and the size and cost of the inspection system 60 including the inspection device 70 can be reduced.

Modified Example 7

In each of the embodiments and the modified examples, the degree of vacuum of the vacuum heat insulating body 10 covered with the exterior member 31, 41 and the protective layer 32, 42 is inspected. However, the inspection method is not limited to this. The degree of vacuum of the vacuum heat insulating body 10 from which the exterior member 31, 41 and the protective layer 32, 42 are detached may be inspected.

Figure 21:
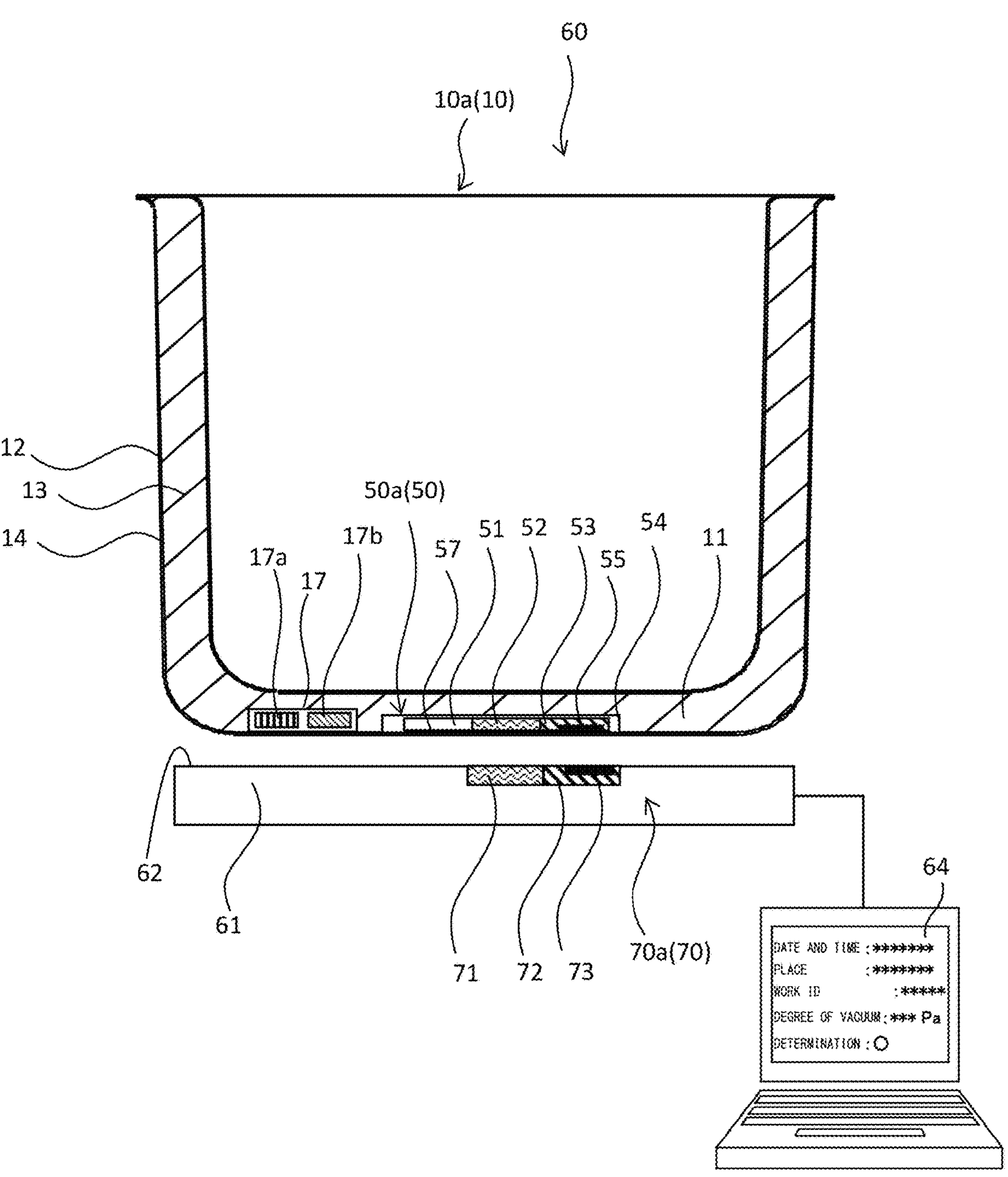
FIG. 21 is a diagram showing the inspection system for the vacuum heat insulating body according to Modified Example 7 of the present invention.

For example, as shown in FIG. 21, the first vacuum heat insulating body 10*a* is placed on the first placement surface 62 without through the first exterior member 31 and the first protective layer 32. With this, through the outer covering member 14 of the first vacuum heat insulating body 10*a*, the receiving portion 71 is opposed to the transmitting portion 52, and the electric power receiving coil 55 of the electric power supply portion 53 is opposed to the electric power transmitting coil 73 of the electric power transmitting portion 72. On this account, an interval between the receiving portion 71 and the transmitting portion 52 and an interval between the electric power receiving coil 55 and the electric power transmitting coil 73 can be reduced. Therefore, the receiving portion 71 can more surely receive the inspection pressure from the transmitting portion 52, and the electric power receiving coil 55 can more efficiently receive electric power from the electric power transmitting coil 73. Thus, the inspection time can be shortened.

Modified Example 8

Configuration of Inspection System for Vacuum Heat Insulating Body

Figure 22:
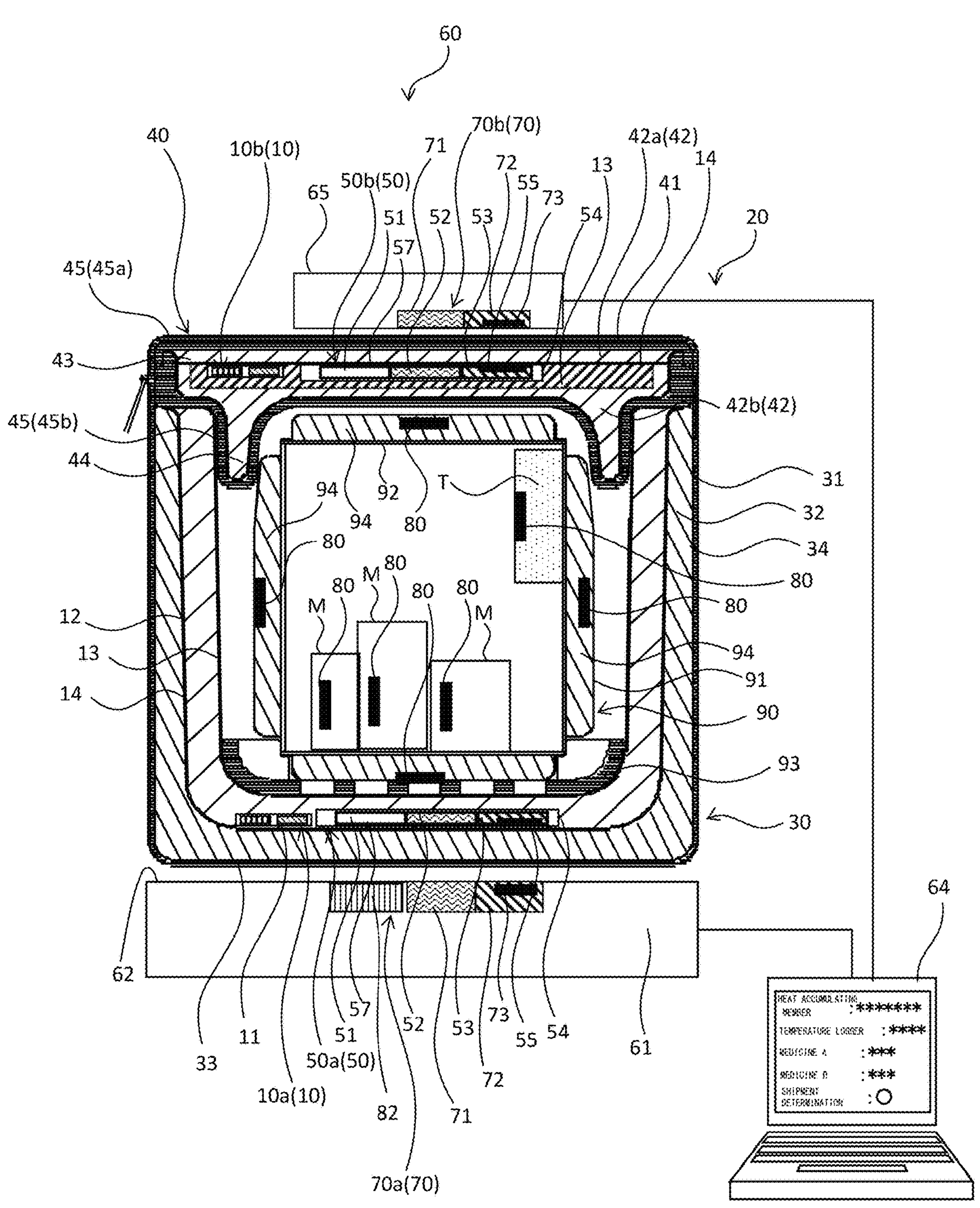
FIG. 22 is a diagram showing the inspection system for the vacuum heat insulating body according to Modified Example 8 of the present invention.

In each of the embodiments and the modified examples, as shown in FIG. 22, the inspection system 60 may further include ID tags 80 and an ID reader 82 in addition to the vacuum heat insulating body 10, the inspection device 70, and the base 61. With this, the inspection system 60 can perform the inspection of a stored article of the transportation box 20 in addition to the inspection of the heat insulation performance of the vacuum heat insulating body 10.

Figure 23:
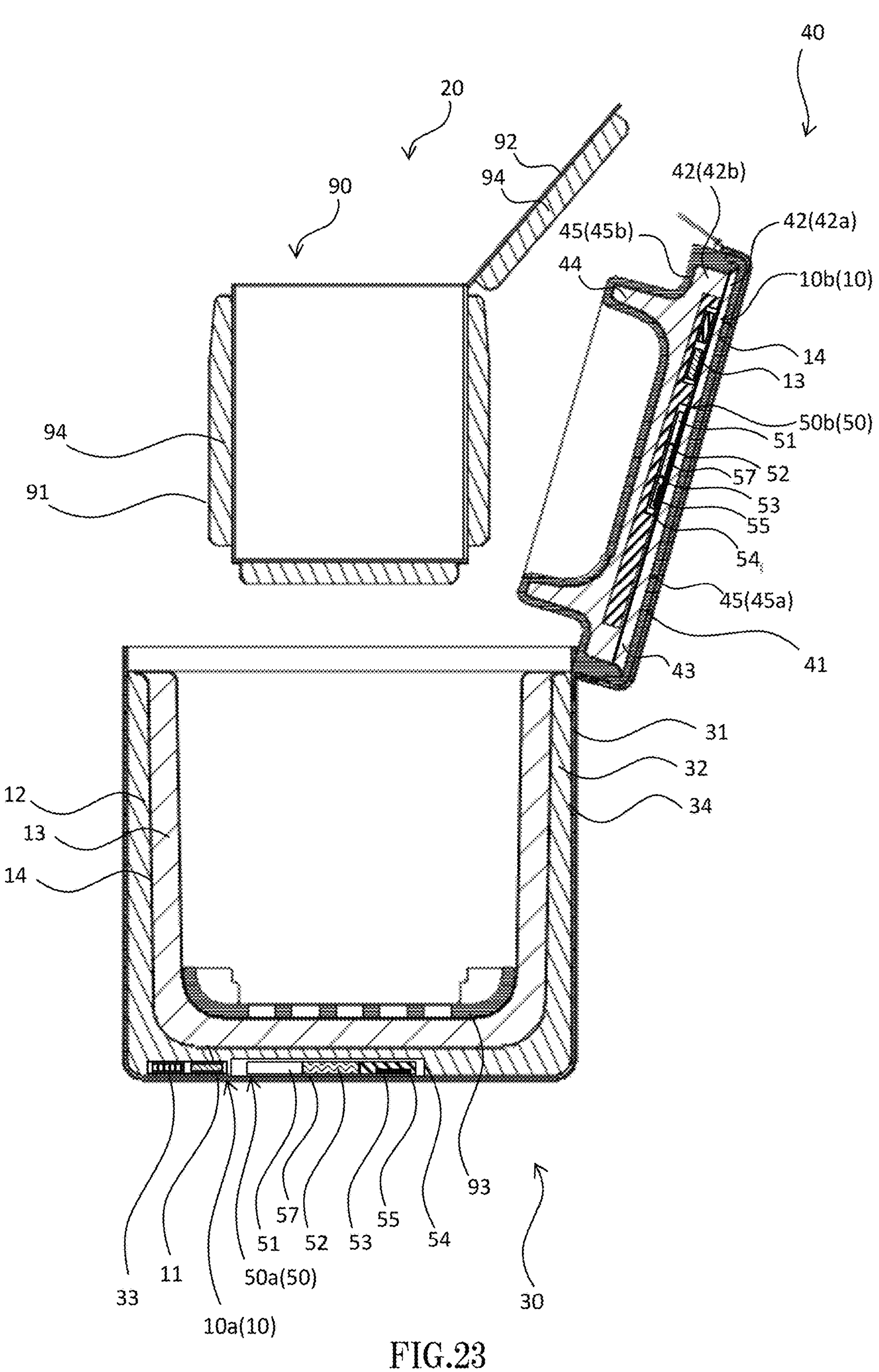
FIG. 23 is a sectional view schematically showing a heat retaining box including a heat retaining lid of FIG. 22 which is open and a heat accumulating container including a heat accumulating lid of FIG. 22 which is open.

Specifically, the transportation box 20 includes the heat retaining container 30, the heat retaining lid 40, and a heat accumulating unit 90. As shown in FIG. 23, the heat accumulating unit 90 includes a heat accumulating container 91, a heat accumulating lid 92, and a supporting portion 93. The heat accumulating container 91 has a box shape whose upper end is open. The heat accumulating lid 92 is attached to an upper end of the heat accumulating container 91 so as to be able to open or close an upper end opening of the heat accumulating container 91. Therefore, it is possible to prevent a case where the heat accumulating container 91 is put into the transportation box 20 without attaching the heat accumulating lid 92 to the heat accumulating container 91.

Each of the heat accumulating container 91 and the heat accumulating lid 92 includes a storing portion along its surface, and the heat accumulating member 94 is detachably stored in the storing portion. The heat accumulating member 94 is a member having a cooling effect or a heat keeping effect. The heat accumulating member 94 surrounds a periphery of an internal space formed by the heat accumulating container 91 and the heat accumulating lid 92 and can cool the internal space or keep the internal space warm. Moreover, a temperature logger T is attached inside the heat accumulating container 91.

The supporting portion 93 is made of, for example, a buffer material, such as styrene foam, and has a shape along an upper surface of the second lower wall 11 of the first vacuum heat insulating body 10*a*. As shown in FIG. 1, the heat accumulating unit 90 is put in the internal space of the transportation box 20 formed by the heat retaining container 30 and the heat retaining lid 40. The supporting portion 93 is located on the second lower wall 11 of the first vacuum heat insulating body 10*a* and supports the heat accumulating container 91 with respect to the first vacuum heat insulating body 10*a*. When the heat retaining container 30 storing the heat accumulating unit 90 is closed by the heat retaining lid 40, the projecting portion 44 of the heat retaining lid 40 is fitted to between the first vacuum heat insulating body 10*a* and the heat accumulating container 91, and the heat accumulating container 91 is supported with respect to the heat retaining container 30.

The ID tags 80 are attached to the heat accumulating member 94, the supporting portion 93, and the stored articles of the vacuum heat insulating body 10 such as the temperature logger T and the articles M. The ID tag 80 is, for example, a passive IC tag, such as a RFID (Radio Frequency IDentifier) tag. The ID tag 80 includes a memory and stores the identification information (stored article ID) of the stored article in the memory. The ID reader 82 is, for example, a RFID reader and includes an antenna. The ID reader 82 is located at the base 61, is lined up with the first inspection device 70*a*, and is connected to the computer 64.

Inspecting Method of Inspection System

The following will describe a case where the inspection system 60 shown in FIG. 22 inspects the degree of vacuum of the vacuum heat insulating body 10 and also inspects the stored articles of the vacuum heat insulating body 10. The following will describe a case where the first inspection device 70*a* is located at the base 61, and the second inspection device 70*b* is included in a terminal 65 that is portable separately from the base 61. However, the type of the second inspection device 70*b* is not limited to this. For example, as shown in FIG. 8, the second inspection device 70*b* may be provided at the base 61 together with the first inspection device 70*a*.

First, for example, the heat accumulating members 94 that have been cooled to several degrees centigrade in advance are stored in the storing portion of the heat accumulating container 91 and the storing portion of the heat accumulating lid 92, and the temperature logger T is attached to an inside of the heat accumulating container 91. The articles M are put in the heat accumulating container 91, and the opening of the heat accumulating container 91 is closed by the heat accumulating lid 92. Then, the heat accumulating unit 90 is stored in the heat retaining container 30, and the opening of the heat retaining container 30 is closed by the heat retaining lid 40.

Then, the transportation box 20 is arranged on the first placement surface 62 such that the first wireless vacuum gauge device 50*a* is opposed to the first inspection device 70*a*. Moreover, the terminal 65 is arranged on the heat retaining lid 40 such that the second wireless vacuum gauge device 50*b* is opposed to the second inspection device 70*b*. With this, the transmitting portion 52 is opposed to the receiving portion 71, and the electric power receiving coil 55 of the electric power supply portion 53 is opposed to the electric power transmitting coil 73 of the electric power transmitting portion 72.

In this state, when the alternating current flows through the electric power transmitting portion 72 by the computer 64, electric power is transmitted from the electric power transmitting coil 73 to the electric power receiving coil 55, and the electric power supply portion 53 supplies the electric power, received by the electric power receiving coil 55, to the pressure sensor 51 and the transmitting portion 52. The pressure sensor 51 detects the pressure of the vacuum heat insulating body 10 and outputs the pressure to the transmitting portion 52, and the transmitting portion 52 transmits the inspection pressure and its own transmitting portion ID. With this, the receiving portion 71 receives the inspection pressure and the transmitting portion ID and outputs its own receiving portion ID together with the inspection pressure and the transmitting portion ID to the computer 64.

Moreover, the computer 64 drives the ID reader 82 and transmits a radio wave from the ID reader 82. The ID tag 80 receives the radio wave from the ID reader 82 and transmits the stored article ID of the ID tag 80. The ID reader 82 receives the stored article ID and outputs the stored article ID to the computer 64.

The computer 64 associates the inspection pressure of the vacuum heat insulating body 10, the transmitting portion ID, the receiving portion ID, and the inspection date and time with each stored article ID, stores them in the storage portion 105, and displays them on the display device 108. With this, the degree of vacuum of the vacuum heat insulating body 10 and the inspection place of the vacuum heat insulating body 10 can be acquired from the inspection pressure, the transmitting portion ID and the receiving portion ID, and the presence or absence of the vacuum heat insulating body 10, the heat accumulating member 94 stored in the vacuum heat insulating body 10, the supporting portion 93, and the stored articles, such as the temperature logger T and the articles M, can be determined from the transmitting portion ID and the stored article IDs. Therefore, when list data in which the vacuum heat insulating body 10 and the stored articles are associated with each other is prepared in advance, and the stored article IDs of all the articles of the list data are acquired, it can be determined that: no articles are forgotten to be stored in the vacuum heat insulating body 10; and the vacuum heat insulating body 10 passes a shipment determination. As above, article management of the vacuum heat insulating body 10 and the stored articles can be performed.

Moreover, when at least one of the remaining life or the usable period of the vacuum heat insulating body 10 is estimated, this may be associated with the inspection pressure of the vacuum heat insulating body 10, the transmitting portion ID, the receiving portion ID, the inspection date and time, and the stored article IDs and stored in the storage portion 105. With this, the vacuum heat insulating bodies 10 can be more easily and collectively managed.

Other Modified Examples

In each of the embodiments and the modified examples, the management system 100 for the vacuum heat insulating body 10 manages the vacuum heat insulating body 10 including the wireless vacuum gauge device 50. However, the management system 100 can manage the vacuum heat insulating body 10 that does not include the wireless vacuum gauge device 50. In this case, the inspection device 70 of the management system 100 includes a sensor that detects the internal pressure of the vacuum heat insulating body 10. With this, the pressure of the vacuum heat insulating body 10 is detected, and the management system 100 can manage the vacuum heat insulating body 10 based on the inspection pressure.

In each of the embodiments and the modified examples, the internal pressure of the vacuum heat insulating body 10 is used as the heat insulation performance of the vacuum heat insulating body 10. However, the heat insulation performance of the vacuum heat insulating body 10 is not limited to this. For example, heat conductivity may be used as the heat insulation performance of the vacuum heat insulating body 10. The heat conductivity can be measured by a heat flow meter or the like.

In each of the embodiments and the modified examples, the remaining life of the vacuum heat insulating body 10 is determined as the usable period of the vacuum heat insulating body 10. However, a period shorter than the remaining life of the vacuum heat insulating body 10 may be determined as the usable period of the vacuum heat insulating body 10. For example, a period obtained by subtracting a predetermined period of time (for example, three months) from the remaining life may be determined as the usable period. The vacuum heat insulating body can be systematically managed based on the usable period.

In each of the embodiments and the modified examples, in Step S10, the determining portion 102 informs of the usable period of the vacuum heat insulating body 10. However, the determining portion 102 may inform of the remaining life or the life of the vacuum heat insulating body 10.

In each of the embodiments and the modified examples, when the number of data pieces of the inspection pressure of the vacuum heat insulating body 10 which are accumulated in the storage portion 105 is a predetermined number (four, for example), the estimating portion 101 may estimate the life of the vacuum heat insulating body 10 by using the data pieces. With this, estimation accuracy of the life of the vacuum heat insulating body 10 can be improved.

In each of the embodiments and the modified examples, in Step S2 of FIGS. 12 and 16 to 18, the determining portion 102 determines whether or not the pressure of the vacuum heat insulating body 10 is lower than the predetermined pressure. Instead of this, the determining portion 102 may determine whether or not the change rate in the time-lapse change of the pressure of the vacuum heat insulating body 10 has increased by a predetermined multiple or more. Herein, when the change rate has increased by a predetermined multiple or more, the determining portion 102 informs that the transportation box 20 is unusable (Step S3).

In the management system 100 for the vacuum heat insulating body 10 according to each of the embodiments and the modified examples, in Step S7 of FIGS. 12 and 16 and Step S7 of FIG. 18, the determining portion 102 may estimate the life by using all the detected pressures of the vacuum heat insulating body 10 which are accumulated in the storage portion 105 or may estimate the life by using some of the detected pressures. For example, by using a predetermined number of recent pressures or by using recent pressures within a predetermined period of time, the life on which recent tendency is reflected can be estimated.

In the management system 100 for the vacuum heat insulating body 10 according to each of the embodiments and the modified examples, in Steps S4 and S11 of FIGS. 12, 17, and 18, the user determines the order for the transportation box 20 based on the informing of the determination result of the vacuum heat insulating body 10. Moreover, in Steps S4 and S11 of FIG. 16, the provider determines the order for the transportation box 20 based on the informing of the determination result of the vacuum heat insulating body 10.

However, the ordering portion 103 may automatically place the order for the transportation box 20 if there is a determination result indicating that: the inspection pressure of the vacuum heat insulating body 10 is the predetermined pressure or higher (No in Step S2); the remaining life of the vacuum heat insulating body 10 is less than the predetermined period of time (No in Step S9); the inspection pressure of the vacuum heat insulating body 10 is the second predetermined pressure or higher (No in Step S13); or the inspection pressure of the vacuum heat insulating body 10 is the first predetermined pressure or higher (No in Step S14). With this, each of the user and the provider can possess a predetermined number of transportation boxes 20.

In each of the embodiments and the modified examples, each time the pressure or the life of the vacuum heat insulating body 10 does not satisfy the predetermined heat insulation performance in FIGS. 12 and 17 to 19 (No in Step S2; No in Step S9; No in Step S13; No in Step S14), the ordering portion 103 receives the order for the transportation box 20 (Steps S5, S11, and S15). However, when a predetermined number of vacuum heat insulating bodies 10 do not satisfy the predetermined heat insulation performance, the ordering portion 103 may receive the order for the transportation boxes 20. Or, when a predetermined number of vacuum heat insulating bodies 10 do not satisfy the predetermined heat insulation performance, and the number of transportation boxes 20 in stock is a predetermined number or less, the ordering portion 103 may receive the order for the transportation boxes 20. With this, the convenience of the user and the provider improves.

In each of the embodiments and the modified examples, the outer covering member 14 is made of a nonmetal. However, a part of the outer covering member 14 may be made of a metal, such as aluminum or stainless steel. For example, a region of the outer covering member 14 which is opposed to at least one of the electric power receiving coil 55 or the transmitting portion 52 may be made of a nonmetal, and a part or all of the other region may be made of a metal, such as metal foil. With this, the electric power receiving coil 55 can receive electric power from the electric power transmitting coil 73 through the nonmetal outer covering member 14. Moreover, the transmitting portion 52 can communicate with the receiving portion 71 through the nonmetal outer covering member 14, and the other region can maintain the high degree of vacuum of the inside of the outer covering member 14 by the metal foil.

Moreover, the outer covering member 14 may have a layered structure including a nonmetal film and a metal deposited film. With this, since the metal deposited film is interposed between the electric power receiving coil 55 and the electric power transmitting coil 73, the electric power supply efficiency deteriorates a little, but the degree of vacuum of the inside of the outer covering member 14 can be maintained high. In this case, the metal deposited film may not be formed in a region of the outer covering member 14 which is opposed to at least one of the electric power receiving coil 55 or the transmitting portion 52, and the metal deposited film may be formed in a part or all of the other region.

In each of the embodiments and the modified examples, the vacuum heat insulating body 10 is covered with the exterior member 31, 41 and the protective layer 32, 42. However, the vacuum heat insulating body 10 may not be covered with the exterior member 31, 41 and the protective layer 32, 42 or may be covered with any one of the exterior member 31, 41 and the protective layer 32, 42.

In each of the embodiments and the modified examples, the electric power transmitting portion 72 and the receiving portion 71 are arranged so as to be lined up. However, the arrangement of these is not limited to this. For example, since the electric power transmission efficiency improves as the interval between the electric power transmitting coil 73 of the electric power transmitting portion 72 and the electric power receiving coil 55 of the electric power supply portion 53 decreases, it is preferable that the electric power transmitting portion 72 be arranged such that the electric power transmitting coil 73 and the electric power receiving coil 55 correspond to each other. On the other hand, when the BLE is used for the communication between the electric power transmitting portion 72 and the receiving portion 71, the receiving portion 71 can communicate with the transmitting portion 52 located away from the receiving portion 71. Therefore, the electric power transmitting portion 72 may be arranged such that the electric power transmitting coil 73 corresponds to the electric power receiving coil 55, and the receiving portion 71 may be arranged at a position away from a position corresponding to the transmitting portion 52.

The above embodiments may be combined with each other as long as they do not exclude each other. From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

The management system for the vacuum heat insulating body according to the present disclosure is useful as, for example, a management system for a vacuum heat insulating body by which the vacuum heat insulating body that satisfies predetermined heat insulation performance can be continuously used.

REFERENCE SIGNS LIST

10 vacuum heat insulating body
10 first vacuum heat insulating body
**10*a*** first vacuum heat insulating body
**10*b*** second vacuum heat insulating body
70 inspection device
**70*a*** first inspection device
**70*b*** second inspection device
100 management system
101 estimating portion
102 determining portion
103 ordering portion
104 order receiving portion

The invention claimed is:

1. A management system for a vacuum heat insulating body, the management system comprising:

an inspection device that inspects heat insulation performance of a vacuum heat insulating body:

a storage portion that stores information regarding the inspected heat insulation performance;

an estimating portion that estimates a remaining life, which is the rest of a life of the vacuum heat insulating body, from a time-lapse change of the heat insulation performance stored in the storage portion; and a determining portion that determines whether or not the remaining life is a predetermined period of time or more, wherein the vacuum heat insulating body includes a gas adsorbing member;

the heat insulation performance of the vacuum heat insulating body changes through a first period in which a change rate of the heat insulation performance is constant, a second period which is continuous with the first period and in which the change rate is variable, and a third period which is continuous with the second period and in which the change rate is constant; and the life is a total period including the first period and the second period.

2. The management system according to claim 1, wherein:

the heat insulation performance of the vacuum heat insulating body changes through a first period in which a change rate of the heat insulation performance is constant and a second period which is continuous with the first period and in which the change rate is variable; and the life is the first period.

3. The management system according to claim 1, wherein the heat insulation performance is internal pressure of the vacuum heat insulating body.

4. The management system according to claim 1, wherein when the remaining life is less than the predetermined period of time, the determining portion determines a period that is the remaining life or less, as a usable period of the vacuum heat insulating body.

5. The management system according to claim 1, wherein:

the heat insulation performance is internal pressure of the vacuum heat insulating body;

when the internal pressure of the vacuum heat insulating body is lower than first predetermined pressure, the determining portion determines that the vacuum heat insulating body is usable;

when the internal pressure of the vacuum heat insulating body is the first predetermined pressure or higher and is lower than second predetermined pressure higher than the first predetermined pressure, the determining portion determines that the vacuum heat insulating body is usable this time but is unusable next time; and when the internal pressure of the vacuum heat insulating body is the second predetermined pressure or higher, the determining portion determines that the vacuum heat insulating body is unusable.

6. A management system for a vacuum heat insulating body, the management system comprising:

an inspection device that inspects heat insulation performance of a vacuum heat insulating body:

a storage portion that stores information regarding the inspected heat insulation performance;

an estimating portion that estimates a remaining life, which is the rest of a life of the vacuum heat insulating body, from a time-lapse change of the heat insulation performance stored in the storage portion;

a determining portion that determines whether or not the remaining life is a predetermined period of time or more;

an ordering portion that places an order for the vacuum heat insulating body based on a determination result of the determining portion; and an order receiving portion that receives the order.

7. The management system according to claim 6, wherein the heat insulation performance is internal pressure of the vacuum heat insulating body.

8. The management system according to claim 6, wherein when the remaining life is less than the predetermined period of time, the determining portion determines a period that is the remaining life or less, as a usable period of the vacuum heat insulating body.

9. The management system according to claim 6, wherein:

the heat insulation performance is internal pressure of the vacuum heat insulating body;

when the internal pressure of the vacuum heat insulating body is lower than first predetermined pressure, the determining portion determines that the vacuum heat insulating body is usable;

when the internal pressure of the vacuum heat insulating body is the first predetermined pressure or higher and is lower than second predetermined pressure higher than the first predetermined pressure, the determining portion determines that the vacuum heat insulating body is usable this time but is unusable next time; and when the internal pressure of the vacuum heat insulating body is the second predetermined pressure or higher, the determining portion determines that the vacuum heat insulating body is unusable.

10. The management system according to claim 6, wherein:

the vacuum heat insulating body includes a gas adsorbing member;

the heat insulation performance of the vacuum heat insulating body changes through a first period in which a change rate of the heat insulation performance is constant and a second period which is continuous with the first period and in which the change rate is variable; and the life is the first period.

11. A management system for a vacuum heat insulating body, the management system comprising:

an inspection device that inspects heat insulation performance of a vacuum heat insulating body:

a storage portion that stores information regarding the inspected heat insulation performance;

an estimating portion that estimates a remaining life, which is the rest of a life of the vacuum heat insulating body, from a time-lapse change of the heat insulation performance stored in the storage portion; and a determining portion that determines whether or not the remaining life is a predetermined period of time or more, wherein the storage portion associates identification information of the inspection device with identification information of the vacuum heat insulating body inspected by the inspection device, and stores the identification information of the inspection device and the identification information of the vacuum heat insulating body.

12. The management system according to claim 11, wherein the heat insulation performance is internal pressure of the vacuum heat insulating body.

13. The management system according to claim 11, wherein when the remaining life is less than the predetermined period of time, the determining portion determines a period that is the remaining life or less, as a usable period of the vacuum heat insulating body.

14. The management system according to claim 11, wherein:

the heat insulation performance is internal pressure of the vacuum heat insulating body;

when the internal pressure of the vacuum heat insulating body is lower than first predetermined pressure, the determining portion determines that the vacuum heat insulating body is usable;

when the internal pressure of the vacuum heat insulating body is the first predetermined pressure or higher and is lower than second predetermined pressure higher than the first predetermined pressure, the determining portion determines that the vacuum heat insulating body is usable this time but is unusable next time; and when the internal pressure of the vacuum heat insulating body is the second predetermined pressure or higher, the determining portion determines that the vacuum heat insulating body is unusable.

15. The management system according to claim 11, wherein:

the vacuum heat insulating body includes a gas adsorbing member;

the heat insulation performance of the vacuum heat insulating body changes through a first period in which a change rate of the heat insulation performance is constant and a second period which is continuous with the first period and in which the change rate is variable; and the life is the first period.

* * * * *